(12) United States Patent
Kanekawa et al.

(10) Patent No.: US 6,513,131 B1
(45) Date of Patent: Jan. 28, 2003

(54) LOGIC CIRCUIT HAVING ERROR DETECTION FUNCTION, REDUNDANT RESOURCE MANAGEMENT METHOD, AND FAULT TOLERANT SYSTEM USING IT

(75) Inventors: Nobuyasu Kanekawa, Hitachi (JP); Shoji Suzuki, Hitachi (JP); Yoshimichi Sato, Hitachi (JP); Korefumi Tashiro, Hitachi (JP); Keisuke Bekki, Hitachi (JP); Hiroshi Sato, Katsuta (JP); Makoto Nohmi, Katsuta (JP); Shinya Ohtsuji, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/376,008

(22) Filed: Aug. 19, 1999

Related U.S. Application Data

(62) Division of application No. 08/962,879, filed on Nov. 3, 1997, now Pat. No. 6,092,217, which is a division of application No. 08/323,094, filed on Oct. 14, 1994, now Pat. No. 5,802,266.

(30) Foreign Application Priority Data

Oct. 15, 1993 (JP) .............................. 5-258014
Feb. 25, 1994 (JP) .............................. 6-27664

(51) Int. Cl.[7] .............................................. G06F 7/02
(52) U.S. Cl. .......................................... 714/11; 714/12
(58) Field of Search ..................... 714/11, 12

(56) References Cited

U.S. PATENT DOCUMENTS

| | | | |
|---|---|---|---|
| 4,222,515 A | | 9/1980 | Strelow |
| 4,318,173 A | * | 3/1982 | Freedman et al. .......... 709/103 |
| 4,356,546 A | * | 10/1982 | Whiteside et al. ............ 714/10 |
| 4,412,281 A | * | 10/1983 | Works |
| 4,703,435 A | | 10/1987 | Darringer et al. |
| 4,759,019 A | | 7/1988 | Bentley et al. ................. 371/3 |
| 4,896,272 A | | 1/1990 | Kurosawa |
| 4,999,837 A | | 3/1991 | Reynolds et al. .............. 371/3 |
| 5,001,712 A | | 3/1991 | Splett et al. .................... 371/3 |
| 5,008,885 A | | 4/1991 | Huang et al. ................. 371/5.1 |
| 5,046,068 A | | 9/1991 | Kubo et al. ................. 371/47.1 |
| 5,084,878 A | | 1/1992 | Kanekawa et al. ........... 371/36 |
| 5,231,640 A | | 7/1993 | Hanson et al. |
| 5,243,607 A | | 9/1993 | Massan et al. ............. 371/69.1 |
| 5,276,690 A | | 1/1994 | Lee et al. ....................... 371/3 |
| 5,452,443 A | | 9/1995 | Oyamada et al. |

FOREIGN PATENT DOCUMENTS

DE       2813079       4/1993

OTHER PUBLICATIONS

Jean–Charles Fabre, "Saturation: Reduced Idleness for Improved Fault Tolerant" 1988 IEEIE, pp. 200–205.
Y. Toma, "Theory of Fault Tolerant System", Association of Electronics, Information and Communications, 1990.

* cited by examiner

*Primary Examiner*—Ly V. Hua
(74) *Attorney, Agent, or Firm*—Antonelli, Terry, Stout & Kraus, LLP

(57) ABSTRACT

A self-checking circuit, which is useful for a highly reliable system configuration, includes a logic circuit having an error detection function. For function blocks for feeding out a plurality of signals that are at least duplexed, the logic circuit compares the output signals of the function blocks, and detects an error on the basis of results of the comparison. The logic circuit comprises synthesizing means provided to superimpose inherent waveforms assigned in advance to the respective output signals of the function blocks onto the output signals of one of the function blocks. The inherent waveforms are orthogonal waveforms generated by an orthogonal waveform generator circuit. The logic circuit also comprises comparison means for comparing a signal output of the synthesizing means with the signal output of the other function block to detect an error. The whole circuit including the function blocks are judged normal only if the waveforms inherent to both output signals exist.

14 Claims, 28 Drawing Sheets

| NUMBER OF NORMAL COMPUTER MODULES | TASK EXECUTED BY COMPUTER MODULE | | | | |
|---|---|---|---|---|---|
| | 1 | 2 | 3 | 4 | 5 |
| 5 | 1 | 1 | 1 | 2 | 2 |
| 4 | 1 | 1 | 2 | 2 | x |
| 3 | 1 | 1 | 2 | x | x |
| 2 * | 1 | 1 | x | x | x |
| 1 * | 1 | x | x | x | x |

1 : TASK 1
2 : TASK 2
x : STOP
* : CONTROL BY TABLE OF NUMBER

LOGIC CIRCUIT HAVING ERROR DETECTION FUNCTION, REDUNDANT RESOURCE MANAGEMENT METHOD, AND FAULT TOLERANT SYSTEM USING IT

This is a divisional application of Ser. No. 08/962,879, filed Nov. 3, 1997 U.S. Pat. No. 6,092,217; which is a divisional of Ser. No. 08/323,094, filed Oct. 14, 1994, now U.S. Pat. No. 5,802,266.

BACKGROUND OF THE INVENTION

The present invention relates to a self-checking circuit and its method of operation. More particularly, it concerns a self-checking circuit useful for a highly reliable system configuration.

Also, the present invention relates to a method management of a redundant resource, and more particularly concerns an effective use of the redundant resource in a fault tolerant computer system.

Control systems for airplanes, trains, automobiles, and similar means of transportation have been increasingly integrated as advanced control performances are needed to increase energy (fuel) efficiency, operationability, comfortability, and the operation speeds thereof. To run the transportation systems safely, the control systems thereof are forcefully required to be high in reliability and fail-safe performance so that no dangerous output is caused by occurrence of a fault.

To assure the reliability and fail-safe performance of a control system, it is important for the control System to have a capability of detecting the occurrence of a fault, that is, to have a self-checking capability. To accomplish such a self-checking capability, a so-called redundant code is generally used that has a hamming distance of higher than 2 between codes, such as the M-out-of-N code and two-rail logic (1-out-of-2 code) that can be regarded as a kind of M-out-of-N code. The redundant code can perfectly detect a fault as long as it is a single fault. However, it cannot always detect multiple faults. If a self-checking circuit is accomplished in an LSI, a fault may spread over the whole chip. This would be a phenomenon equivalent to the occurrence of multiple faults. Assuming the errors are random, Eq. 1 below gives a probability η of the occurrence of wrong output signals due to a fault coincident with code points in a specific output code space 0.

$$\eta = No/Nu \quad (1)$$

where No is a number of the code points in the output code space 0 and Nu is a number of the code points. Therefore, it is a problem how to increase Nu to No to increase the detection rate.

There are the following two methods to accomplish a self-checking circuit having such redundant codes as described above.

(1) A method of forming the whole circuit of redundant codes.

(2) A method of replicating function blocks and using a self-checking comparison circuit formed of redundant codes to compare signals output from the function blocks.

The method (1) above is involved in problems that the circuit must be newly designed to make self-checking possible and it is difficult to optimize its operation speed.

On the other hand, the method (2) has the advantage that a conventional processor, memory, and other devices can be used for the function blocks, since only the comparison circuit is required to be newly designed in redundant logic. This can decrease the development cost to a great extent. It also can easily make the operation speed high since advanced semiconductor techniques can be used. The self-checking coverage of the method (2) greatly depends on that of the comparator.

Accordingly, to provide a self-checking comparator, it was proposed to use redundant codes, such as the M-out-of-N code and two-rail logic (1-out-of-2 code), for the logic itself used in the comparison circuit. See, for example, Yoshihiro Toma, "Theory of Fault Tolerant System," Association of Electronics, Information and Communications, 1990. To realize a self-checking comparator, the RCCO (Reduction Circuit for Checker Output) circuit shown in FIG. 2.5 on page 31 of the publication was connected to a tree structure as shown in FIG. 2.6 on page 32 thereof.

The probability of a fault occurring in the circuits to be compared is low. It is therefore rare that the signals to be compared do not coincide. This means that it is rare that a path to be activated upon detection of an inequality is activated. If there occurs such a mode of fault as fixing, so that the signal output of the path always represents an 'equality,' it is feared that the fault is made latent. The comparison circuit, therefore, not only uses the redundant code described above, but also uses a frequency logic, alternating checking method, or similar dynamic logics of alternating signal levels as a signal indicating that the circuit is normal (hereinafter referred to as a signature signal), in place of the binary level logic of 0 and 1. As an example, we can use a method of repositioning a permuter for injecting a simulated fault for testing into the RCCO shown in FIGS. 2. and 5.16 on page 42 in the abovementioned "Theory of Fault Tolerant System." In this way, an alternating output signal is obtained if the operation is normal. However, the alternating output signal is not obtained, on the other hand, if a fault is caused by a change of a threshold value of a semiconductor device or a fault due to a change of a dc characteristic of the device, such as a failure stacked at 0 or 1. The method also injects a simulated fault periodically to always confirm operation of the error detection feature. These advantages can provide a circuit with an increase in self-checking performance to a great extent.

The above-described prior art has the disadvantage that an adverse effect of crosstalk or shortcircuit between wiring nets in the semiconductor device is likely to occur. If a fault of the semiconductor device causes crosstalk between the wiring nets or shortcircuit between the wiring nets if migration of a wiring material or poor insulation between insulation layers causes a shortcircuit, the wiring net that should not have a signature signal itself may have a signature signal of another wiring net induced thereinto adversely (hereinafter referred to as a counterfeit signature). In general, a fail-safe circuit has a signature signal to indicate that the circuit is normal. The circuit may recognize that it is normal in spite of the counterfeit signature due to crosstalk or a shortcircuit; however, there is the fear that the fail-safe performance of the circuit may be lost.

To prevent such an occurrence of crosstalk and shortcircuit, the prior art has a special design restriction in the wiring spaces. However, this technique requires transistors and wiring lines on the semiconductor substrate having restrictions which are quite different from those of general semiconductors, it cannot have any of the convenience the prior art and automatic designing tools. Most designing works must be performed manually.

Further, computers and transportation controls bear central roles for finance and similar social key industries and parts involved in human life in controlling spaceships and airplanes in recent years. System breakdown or wrong system operation due to a fault of the computers can spread to cause fatal effects in society. In such a trend, high reliability of the computers is increasingly needed.

To make the computers reliable, redundancy is generally employed by providing extra computers and units forming the computer in advance.

On the other hand, the redundant hardware provided to make the computer highly reliable results in a great increase in the cost, dimensions, weight, and power consumption. To enhance the investment effect, or the cost performance, of the fault tolerant computer system, it is necessary to increase the redundant hardware resource effectively with respect to the reliability and processing performance thereof.

There is a method of redundant resource management which uses a redundant hardware resource. That is proposed by Jean-Charles Fabre, et al., "Saturation: reduced idleness for improved fault-tolerance," Proc. FTCS-18 (The 18th Int'l Symp. on Fault-tolerant Computing), pp. 200–205, 1988.

The proposal by Jean-Charles Fabre, et al., mentioned has MNC (minimum number of copies), or redundant copies, provided in advance to be simultaneously executed for each of a plurality of tasks. If a number of idle nodes (redundant computer modules) is larger than the MNC at the time of arrival of a task execution request, the idle nodes start execution of the task, if the number of idle nodes is smaller than the MNC, the system waits until current execution of the tasks ends so as to have a required number of idle nodes.

The proposal by Jean-Charles Fabre, et al., mentioned above is a useful method of redundant resource management for an OLTP (online transaction processor) that has a task start request made frequently.

However, the prior art lacks sufficient consideration of the occurrence of a fault and further occurrence of multiple faults with a view toward providing a making highly reliable real time control computer. This is due to the fact that the proposed method is based on the assumption that the task execution time is sufficiently shorter than the MTBF (mean time between failures) with respect to the operational characteristic of the OLTP that the transaction ends in a short time. However, the real time control computer often has tasks executed for a long period of time. The computer of an airplane, spaceship, etc., for example, must not only run for the mission time normally, but also must provide support even when halting the mission. For this reason, the task execution time cannot be ignored as compared with the MTBF. We must take into account the occurrence of a fault and further occurrence of multiple faults.

The above-described prior method has a number of assigned computer modules managed only at the time of task execution start. Therefore, no computer modules are newly added even if the task executing computer module is caused to fail to function by occurrence of a fault during execution of a task. This means that if a fault occurs during execution of the task, task execution is continued while the degree of redundancy is decreased that is the number of computer modules that is redundantly executing the task. The reliability of the task is lost. If one of two computer modules redundantly executing a task fails to function, for example, should a second fault occur continually, execution of the task is halted.

SUMMARY OF THE INVENTION

A first advantage of the present invention consists in particular in the fact that a logic circuit having an error detection function that has a plurality of function blocks feeding out a plurality of signals, which are at least duplexed, compares the output signals of the function blocks, and detects an error on the basis of results of the comparison. The logic circuit comprises synthesizing means provided to superimpose inherent waveforms assigned in advance to the respective output signals of the function blocks onto the output signals of one of the function blocks, and comparison means for comparing a signal output of the synthesizing means with the signal output of the other function block to detect an error.

For a semiconductor device, as an example, an inherent signal waveform is assigned to each of the wiring nets corresponding to the above-mentioned output signals as a signature. The signature should be regarded as authentic only if the signal waveform coincides with the one inherent to the wiring net.

To distinguish an authentic signature from a counterfeit signature, it is desirable to make the signatures inherent to wiring nets which do not correlate to one another. Orthogonal functions are well known not to correlate to one another. Functions fi(x) and fj(x) are orthogonal to each other when $$\int_{-\infty}^{\infty} fi(x) \cdot fj(x)\, dx = 0 \qquad \text{eq. 2}$$

A wavelet analysis that can analyze a signal waveform in a time-frequency domain has been noted recently in place of the conventional Fourier analysis. The original wavelet also is an orthogonal function. A triangular function and wavelet are analog functions. To use these in a digital circuit, they should be made binary.

With the first feature of the present invention, for a semiconductor device, as an example, an inherent signal waveform is assigned to each of the wiring nets as a signature. The signature should be regarded authentic only if the signal waveform coincides with the one inherent to the wiring net. If a fault of the semiconductor device causes crosstalk between the wiring nets on if migration of a wiring material or poor insulation between insulation layers causes shortcircuit, the wiring net may have a counterfeit signature signal of another wiring net induced thereinto adversely. Should this happen, the counterfeit signature can be distinguished from the authentic signature, since the counterfeit signature does not coincide with the signal waveform inherent to the wiring net. This means that the present invention needs no special wiring restriction to prevent crosstalk or shortcircuit of the type which is indispensable to the prior art to fully detect faults. In addition, the present invention assures fail-safe performance.

The effectiveness of said conventional technology is based on the presumption that the fault detected in either of the said at least dualized function blocks is independent of the other function block. In other words, it is presumed that the same fault never occurs in both of the at-least dualized function blocks at the same time. If the same fault occurs in both of the dualized function blocks at the same time, the fault output from both of said dualized function blocks match and it becomes impossible to detect the fault by comparing them. This becomes a big problem when dualized function blocks are arranged in the same semi-conductor chip. Such problems may be solved by providing the following control methods according to the invention.

The following means, that is called diversity, may be taken to guarantee the independence of faults which occur in either of the said at-least dualized function blocks.

(1) Design Diversity

Design diversity is an effective means to eliminate the influence of faults caused by designs. Especially, N-Version Programming for software is well known. The N-Version Programming is a method to execute N versions of a program that are developed with the same specifications concurrently. Also, in case of hardware, this design diversity can be materialized by developing circuits with the same specifications in N ways. According to this method, however, the number of processes and the expense are increased by N times that of an ordinary method for the design and development. Thus, this approach is not effective or desirable.

To reduce the number of processes and the expense in designing hardware, therefore, the following method is adopted according to this invention.

The main approach to the design of modern hardware is using HDL (Hardware Description Language) to create a file (logical description) that describes the functions and specifications of the subject logical circuits and to create another file (logical net list) that describes the connections of the said logical circuits using a logical synthesis tool on the basis of the HDL. In addition, the said logical net list file is converted to a (physical net list) file that describes the wiring and layout of transistors on the actual semi-conductor chip using an auto wiring tool to create the necessary masks and manufacture semiconductor elements.

In this case, the design constraints, such as the delay time, occupation area, etc., as well as the subject algorithm can be changed for logical synthesis and automatic wiring to diversify the target logical net list and physical net list.

The said dualized function blocks can thus be materialized in the subject semi-conductor chip on the basis of the logical description of the said logical blocks by selecting two physical net lists from among the diversified plural physical net lists.

To select two physical net lists from among many, it is only needed to define a correlation function that indicates how much those physical net lists resemble each other and select a combination of the physical net lists so that the correlation function may be minimized. In this case, fault characteristics of the semiconductor must be affected in the correlation function. In general, wire intersection is pointed out as a weak point of semiconductors. At a wire intersection, two wires are separated only by a thin film oxide, so short-circuits between wires and faults such as crosstalk, etc. are apt to occur. Furthermore, since a wire crosses over the other at such a wire intersection, the wire located at the different level is often cut off with stress. In other words, the status of the intersection between wires affects the fault characteristics of semiconductors. A correlation function in which the fault characteristics of the semi-conductor is affected can thus be defined as follows.

[Formula 1]

$$\Phi_{k1k2} = \sum_{i=1}^{m} \sum_{j=1}^{n} \Phi_{ijk1} \Phi_{jik2} \qquad \text{eq. 1}$$

However, φijk must indicate whether an intersection exists between wiring nets and be defined as follows.

[Formula 2]

$$\Phi_{ijk} = \begin{cases} 0: \text{ no wiring } nets_{ij} \text{ intersecting} \\ 1: \text{ wiring } nets_{ij} \text{ intersecting} \end{cases}$$

(2) Time Diversity

A fault that occurs in either of at-least dualized function blocks due to electric noise, etc. can be prevented from affecting the function block even when they are designed in the same way, by delaying the timings of their operations individually. To produce such a time diversity, the clock or input signal that establishes the timing of a dualized function block operation is supplied to one of the dualized function blocks through a delay circuit. When comparing the output signals from those function blocks, only the signal from the other function block can be output through the delay circuit to compare it with that of the former function block in the comparison circuit.

(3) Space Diversity

When separating one of the said at-least dualized function blocks from the other, it becomes possible to prevent temporary faults that occur in either of those function blocks due to electrical noise, cosmic rays, radiation, etc., as well as due to the damage of the subject semi-conductor chip from affecting the other function block. When a function block is dualized in a chip and each is checked by itself, the dualized function blocks should be arranged in the same direction and in the same pattern. With this, the effectiveness of the space diversity is maximized. The corresponding sections of the dualized function blocks can therefore have the same distance. As a result, it is possible to prevent the corresponding sections of the dualized function blocks from coming close to each other excessively and to deteriorate the effectiveness of the space diversity.

According to this invention, the design diversity, the time diversity, and the space diversity can guarantee independence of the faults to be detected in any of the at-least dualized function blocks by comparing the outputs from both of the function blocks. With this, occurrence of the same type faults at the same time can be eliminated with a correlation in both the dualized function blocks. It also becomes possible to detect faults by comparing the outputs from those function blocks.

A second advantage of the present invention relates in particular to the fact that a distributed fault tolerant system having a plurality of computer modules assigned to execute a plurality of tasks comprises selection and execution means that, if a fault occurs in any of the computer modules of the system, selects at least one of the computer modules having tasks assigned thereto other than the task of the broken computer module, assigns to the selected computer module the task that the broken computer module has executed, and makes the selected computer module execute the task.

Each of the computer modules of the present invention operates as follows:

(1) The computer module broadcasts its fault occurrence information (fault detection results) and process results to the other computer modules at a proper timing (check points) during processing a the task.

(2) The computer modules calculate their respective evaluation functions Fij, where i is a processor number and j is a task number. The evaluation function Fij can be regarded as a margin for the responsibility to be taken on by the computer module for the task. It is based on equality or inequality of the fault occurrence information (fault detection results) and process results broadcast from the other computer modules.

(3) Each of the computer modules decides task j for minimizing the evaluation function Fij as a process to execute before switching the task in process to the process to be executed.

The evaluation function Fij represents a margin of reliability of the task. Therefore, it should be determined so that Fij can be reduced as the importance of the task is increased, Fij can be reduced as the responsibility of the computer module for the task is increased, and Fij can be increased as the reliability of the task is increased.

An example of the evaluation function Fij meeting the conditions mentioned above is $$Fij=Lrj-Lthij, \text{ or}$$

$$Fij=Lrj-Lthij$$

where Lthij is a threshold value of the reliability level of task j in the computer module i, Lrj is the reliability level of task j, i is the computer module number, and j is the task number.

Another example of the evaluation function Fij meeting the conditions mentioned above is $$Fij=\log\{(1-Lthij)/Pej\}$$

where Pej is a probability of wrong calculation results of task j.

It should be noted that Lthij, that is the threshold value of the reliability level of task j, is different depending on the importance of the task. It is set to a high value as the task is needed to have high importance or high reliability.

Further, Lthij has to be different depending on the computer module. It has to be high as the responsibility of the computer module is high for the task.

With the second feature of the present invention, the computer modules are assigned to the tasks so that the evaluation functions Fij can be made to always balance. This will not make Fij of a specific task jut out too high or low. That is, if there is a specific task of low reliability level (hereinafter referred to as an endangered task) due to occurrence of a fault during operation, a computer module in execution of another task having a margin of reliability is made to execute the endangered task. This can prevent the reliability level of the specific task alone from being lowered. For this reason, the second feature can countermeasure any occurrence of fault during execution of the tasks so that the responsibility given to the system can be fulfilled while the reliability is maintained.

Also, since Lthij is set high as the importance of a task is high, Fij can be balanced with the other tasks at a higher Lrj. For this reason, a larger number of computer modules should be assigned to a task whose importance is high to keep a higher reliability level Lrj.

Further, since each of the computer modules can autonomously decide which task to execute, it is necessary to have a central arrangement for assigning task executions, thereby causing no single fault points. This means that a single fault will not affect the whole system, thereby making it possible to increase system reliability.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

The embodiments of the invention will be set forth in detail with reference to the accompanying figures in the following three sections of (1) Self-checking logic, (2) Redundancy resource management, and (3) Diversities.

1. Self-Checking Logic

The following describes in detail self-check comparators that are embodiments according to the present invention, by reference to FIGS. 1 to 19.

Figure 1:
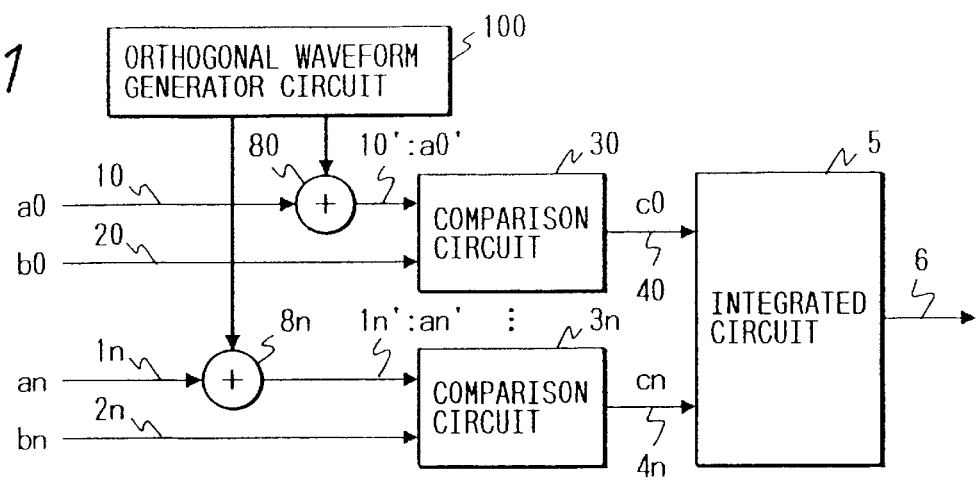
FIG. 1 depicts a circuit diagram illustrating a basic embodiment of the present invention.

FIG. 1 depicts a circuit diagram illustrating a comparator forming an embodiment of the present invention. In operation, signals a0 to an (10 to 1n) fed from a function block A have errors injected thereto for testing by permuters 80 to 8n according to an orthogonal waveform (test pattern) generated by an orthogonal waveform generator circuit 100. The signals having errors become error-injected signals a0' to an' (10' to 1n'). Note that the permuters 80 to 8n, as shown in the figure, are exclusive-OR devices having a feature capable of injection of pseudo-errors for testing. In turn, the error-injected signals 10' to 1n' are compared with signals b0 to bn (20 to 2n) fed from a function block B by comparison circuits 30 to 3n. Comparison results 40 to 4n are collected in an integrator circuit 5. The integrator circuit 5 can feed out a signature signal of normality to a signature output 6 only when the comparison results 40 to 4n are normal signatures.

Let ai' represent any one of the error-injected signals a0' to an' (10' to 1n'). Then, $$ai' = ai \char`\^ pi \qquad (3)$$

where i is a signal number of 0 to n, pi is the orthogonal waveform (test pattern) generated by the orthogonal waveform generator circuit 100, and ^ is an operator for the exclusive-OR devices. Also, let ci represent any one of the comparison results c0 to cn (40 to 4n). Then, $$ci = ai' \char`\^ bi = ai \char`\^ pi \char`\^ bi \qquad (4)$$

If the function blocks A and B are normal, ai=bi. Then, ai^bi=0. Hence, $$ci = pi \qquad (5)$$

Since any one of pi with i being 1 to n are orthogonal to each other, ci also is orthogonal with cj, where i is not equal to j. Assuming ai and pi are are statistically independent, or orthogonal, ai and ai' are orthogonal to each other, and bi and ai' also are orthogonal to each other. In addition to the orthogonal waveforms, the group of waveforms include correlated waveforms of ai with bi and pi with ci. In order to prevent a counterfeit signature from being generated by crosstalk or a shortcircuit as mentioned previously, the circuit layout should be designed so as to separate the signal ai from bi and the signal pi from ci physically. This will keep generation of the counterfeit signature due to crosstalk or a shortcircuit from affecting the function. An embodiment of the circuit layout will be discussed later by referring to FIG. 15.

The embodiment of the present invention described above can provide a fully self-checking comparator without any special wiring limit.

Figure 2:
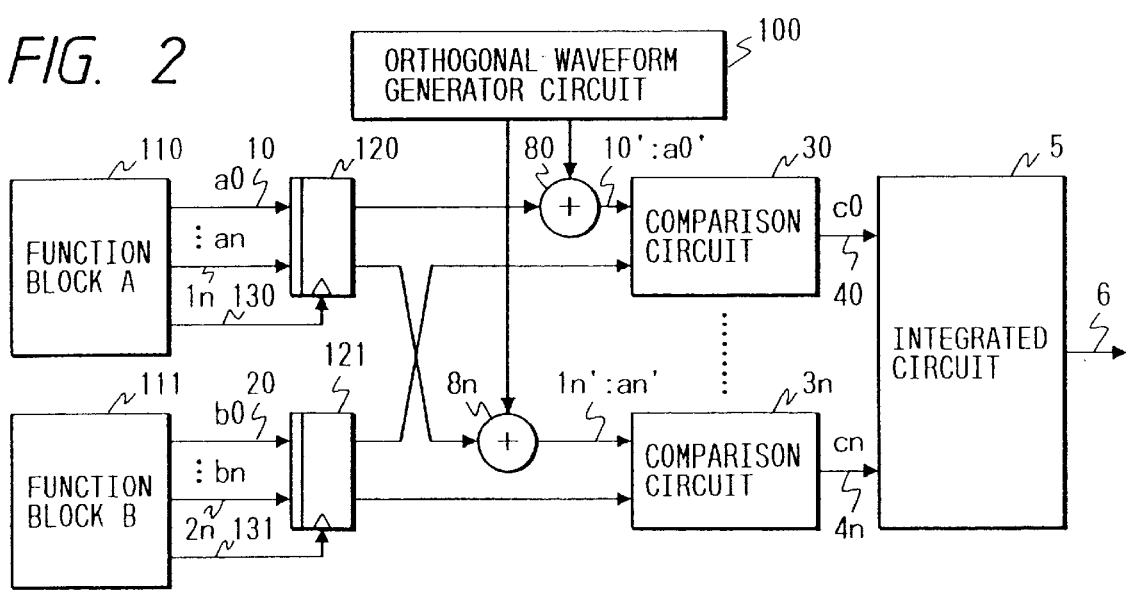
FIG. 2 depicts a circuit diagram illustrating an embodiment corresponding to plural function blocks.

The function blocks A110 and B111 shown in FIG. 2 do not always feed out effective signals a0 to an (10 to 1n) and b0 to bn (20 to 2n), but often feed out signals together with strobe signals that indicate that the signals a0 to an (10 to 1n) and b0 to bn (20 to 2n) are effective. In those cases, as shown in FIG. 2, latch 120 and 121 should be held when the strobe signals 130 and 131 make effective the signals a0 to an (10 to 1n) and b0 to bn (20 to 2n). The kind of signals used for the strobe signals in a circuit having a microprocessor is different depending on the microprocessor. The strobe signals available for an address signal and a control signal include AS (address strobe) and BS (bus start), and the ones for data signals are TA (transfer acknowledge) and DTACK (data transfer acknowledge).

Figure 3:
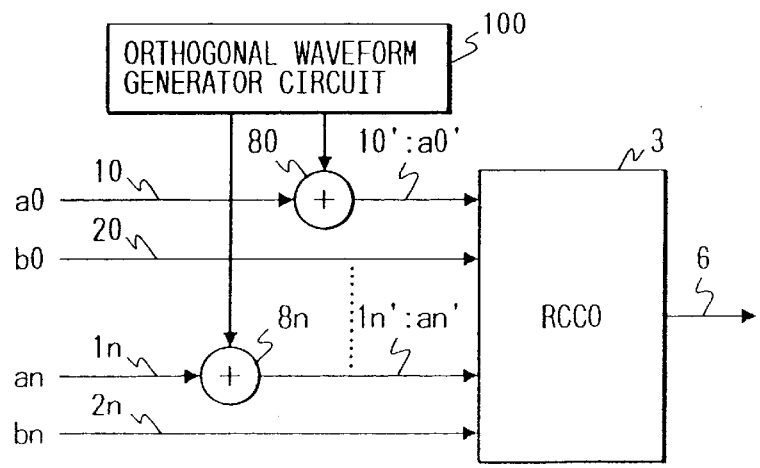
FIG. 3 depicts a circuit diagram illustrating an embodiment of the present invention having a comparator formed of the RCCO tree.

FIG. 3 depicts a circuit diagram illustrating an embodiment of the present invention having a comparator formed of the RCCO tree described in "Theory of Fault Tolerant System," Yoshihiro Toma, Association of Electronics, Information and Communications, 1990. In operation, signals a0 to an (10 to 1n) fed from the function block A have errors injected thereto for testing by the permuters 80 to Bn according to the orthogonal waveform (test pattern) generated by the orthogonal waveform generator circuit 100. The signals having errors become error-injected signals 101 to 1n', which are fed to the RCCO tree 3. Note that in the RCCO tree, the signature output 6 also is of binary logic.

The RCCO tree 3, like the embodiment in FIG. 1, has input and output signals made orthogonal therein to prevent a shortcircuit from generating a counterfeit signature.

The embodiments given below are described on the basis of the comparison circuit in FIG. 1. The comparison circuit of the RCCO tree can be embodied in a similar way unless otherwise specified.

Figure 4:
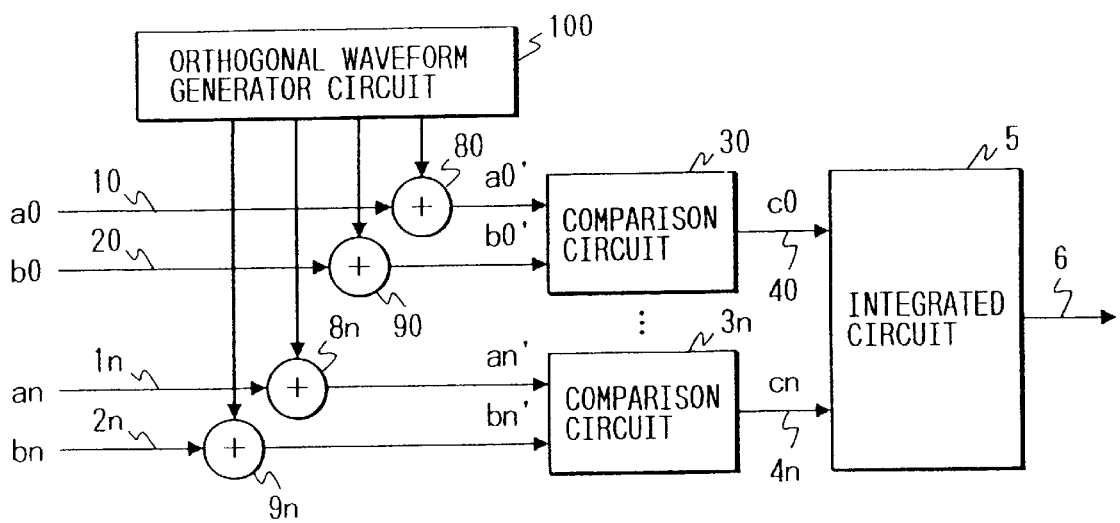
FIG. 4 depicts a circuit diagram illustrating an embodiment of the present invention in which signals fed from a function block B also have an orthogonal waveform added thereto.

FIG. 4 depicts a circuit diagram illustrating an embodiment of the present invention in which signals b0 to-bn (20 to 2n) fed from a function block B have errors injected thereto by permuters 90 to 9n according to an orthogonal waveform generated by an orthogonal waveform generator circuit 100. The embodiment can prevent a stack failure input to the comparison circuit from becoming latent if bi is kept at the same value for a long period of time. If bi is an address signal and a program uses addresses in a specific area only, for example, a high bit of the address is kept at the same value for a long period of time.

Figure 5:
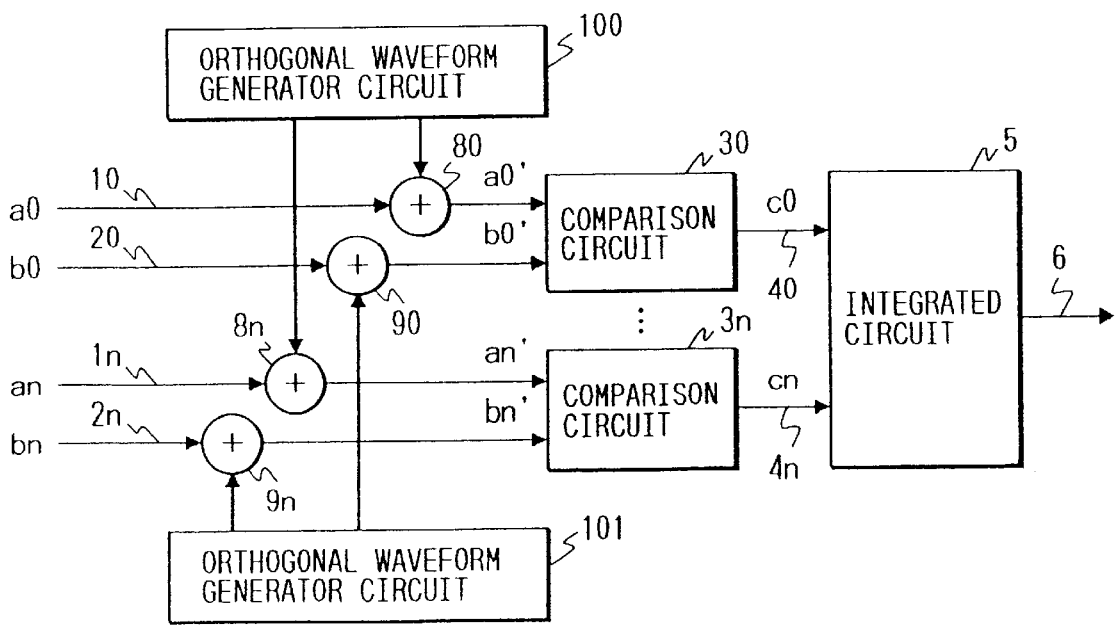
FIG. 5 depicts a circuit diagram illustrating an embodiment of the present invention in which orthogonal waveform generating circuits are duplexed.

FIG. 5 depicts a circuit diagram illustrating an embodiment of the present invention in which the function blocks A and B are associated with independent orthogonal waveform generator circuits 100 and 101, respectively. This embodiment having orthogonal waveform generator circuits 100 and 101 duplexed to detect and report any failures of the orthogonal waveform generator circuits 100 and 101. The embodiment also can make use of a superiority of independency of the two systems on the circuit layout that will be discussed later by referring to FIG. 15.

Figure 6:
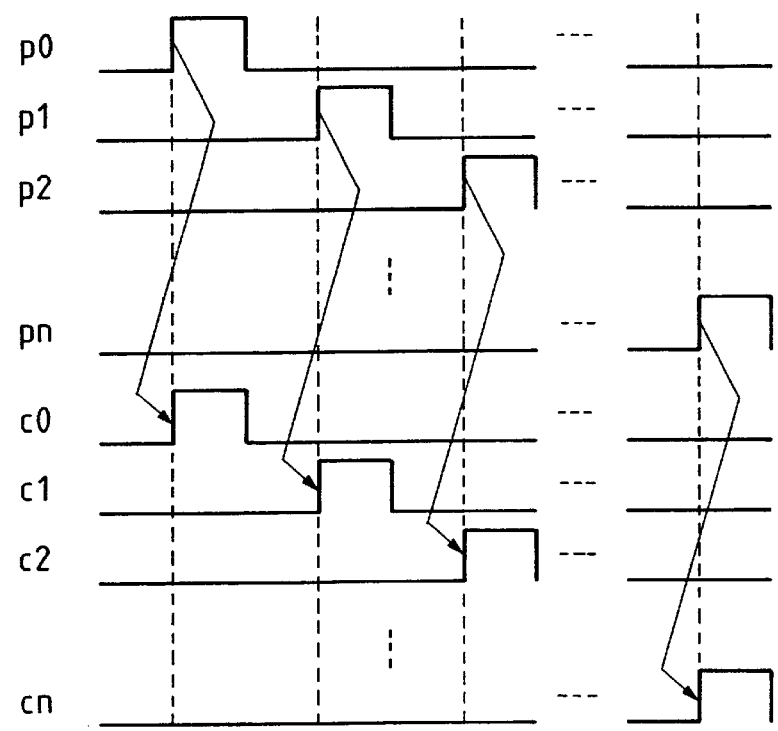
FIG. 6 depicts a signal timing chart illustrating orthogonal function waveforms.

FIG. 6 depicts a signal timing chart illustrating an embodiment of the present invention that uses waveforms having pulses which are turned on at time slots inherent to wiring nets. The figure shows output patterns p0 to pn of the orthogonal waveform generator circuit 100 and comparison results c0 to cn (40 to 4n) when both the function blocks A110 and B111 are operating normally.

Figure 7:
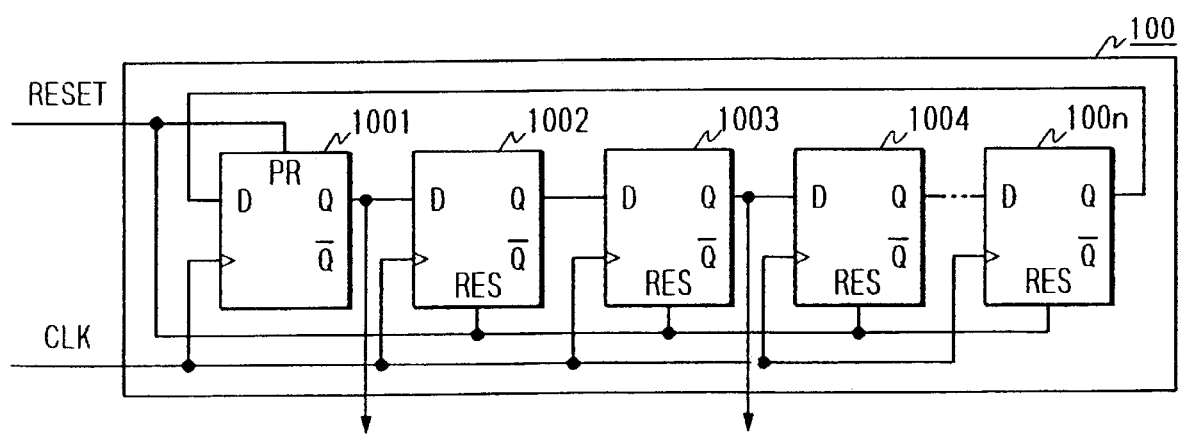
FIG. 7 depicts a circuit diagram illustrating an embodiment of the orthogonal waveform generator circuit.

FIG. 7 depicts a circuit diagram illustrating an embodiment of the orthogonal waveform generator circuit 100 for generating the patterns as shown in FIG. 6. In operation, if the system is in a power-on mode to effect reset, a reset signal is made active to preset a flip-flop 1001 to '1' as an initial value, and then flip-flops 1002 to 100$m$ are reset to '0' as initial value. That is, the train of flip-flops 1001 to 100$m$ are set to 1, 0, 0, 0, 0, . . . , and 0. After the power-on resetting, a CLK (clock) signal successively shifts the pattern of 1, 0, 0, 0, 0, and 0 to generate the pattern as in FIG. 6. The flipflops 1001 to 100m are made redundant; and if a majority of the outputs of each of the redundant flip-flops are taken, that can prevent software errors of the flip-flops due to noises and radioactivity and temporary errors, such as a transient fault, called single event upsets. That also can increase the reliability. Of course, the orthogonal waveform generator circuit 100 also can be used in the RCCO tree 3 in FIG. 3.

Figure 8:
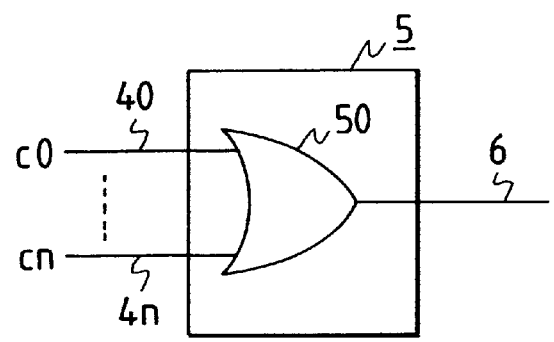
FIG. 8 depicts a circuit diagram illustrating an embodiment of an integrator circuit.

FIG. 8 depicts diagram illustrating an embodiment of an integrator circuit 5 useful for the pattern in FIG. 6. Such a simple OR as in FIG. 8 can make different waveforms of the patterns in FIG. 6. This allows us to determine the occurrence of a failure. Even if a shortcircuit occurs among the wiring nets, an authentic signature will not appear on the signature output 6 wrongly, or no counterfeit signature can be fed out, because there are no other wiring nets that use the authentic signature for p2 and c2. This means that even if a counterfeit signature is generated by a shortcircuit, the embodiment can assure fail-safe performance.

Figure 11:
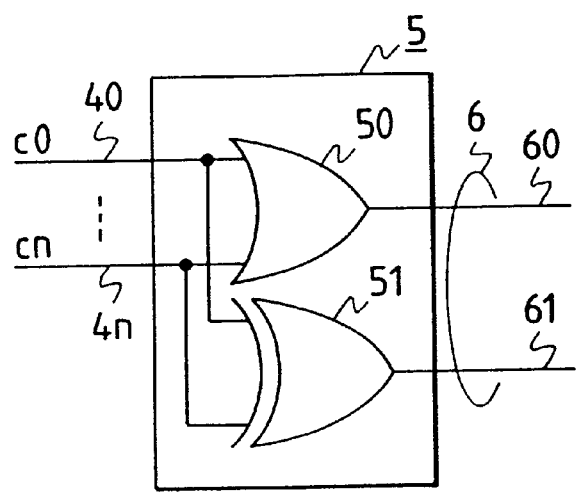
FIG. 11 depicts a circuit diagram illustrating an embodiment of another integrator circuit.
Figure 12:
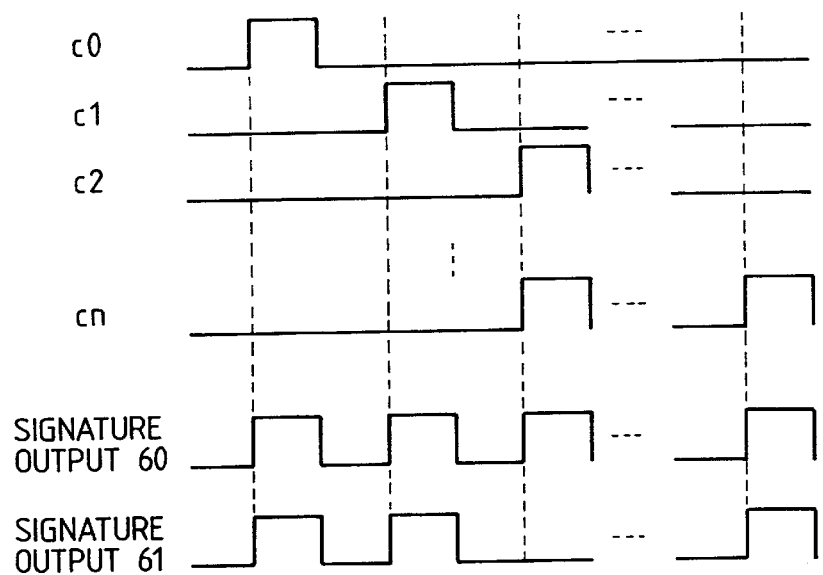
FIG. 12 depicts another timing chart illustrating the orthogonal function waveforms and signature output signal at a time of fault.

FIG. 11 depicts a block diagram illustrating an embodiment of the present invention that has an excess pulse detection feature in addition to the pulse extraction detection feature of the integrator circuit in FIG. 8. The excess pulse is defined here as a phenomenon that some of the signals c0 to cn (40 to 4n) are on simultaneously. In operation, if any one of the signals c0 to cn (40 to 4n) is turned on as in FIG. 9, both OR 50 and EOR 51 generate the signature output signal 6 as in the figure. If c2 and cn are turned on at the same time as in FIG. 12, the signature output line 61 has a pulse extracted as shown in the figure. As the pulse-extracted signal is different from the normal one, it helps us to know of a generation of failure.

Figure 13:
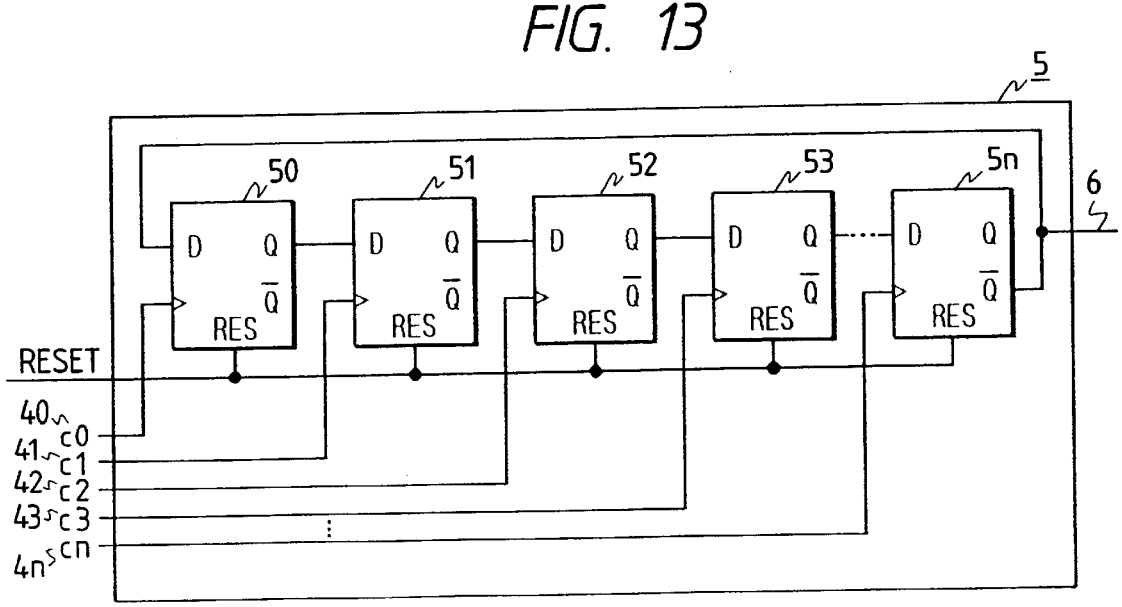
FIG. 13 depicts a circuit diagram illustrating an embodiment of another integrator circuit.
Figure 14:
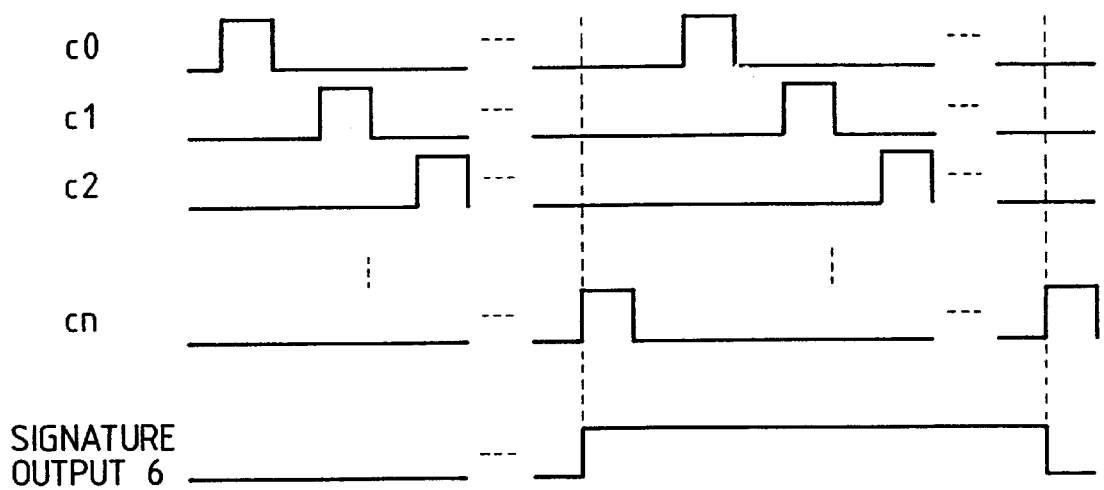
FIG. 14 depicts another timing chart illustrating the orthogonal function waveforms and signature output signal.

FIG. 13 depicts a circuit diagram illustrating an embodiment of the integrator circuit 5 further having a order of coming pulses taken into account. In operation, if the signature pulses as comparison results come in a normal order of c0, c1, c2, . . . , and cn, the signature output signal 6 is level-reverted whenever the signature pulse comes in, as shown in FIG. 14. If any of the signature pulses of c0, c1, c2, . . . , and cn is extracted, however, the signature output signal 6 cannot be reverted or its period is made very much longer. As the period of the signature output signal 6 in this embodiment is made very much longer at failure, it is easy to detect the failure.

Figure 15:
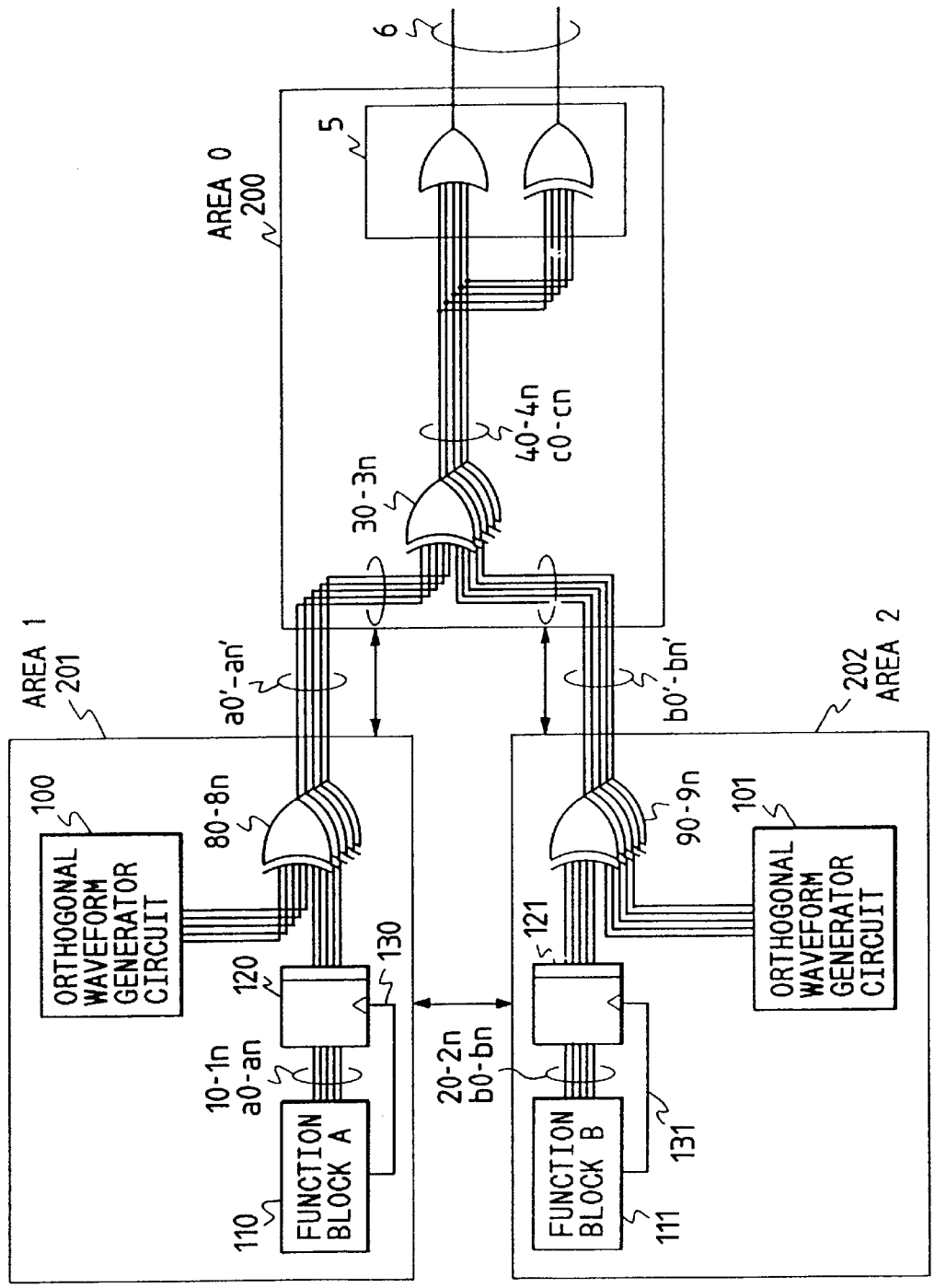
FIG. 15 depicts a detailed circuit diagram illustrating an embodiment of the present invention.

FIG. 15 depicts a detailed circuit diagram illustrating an embodiment of the present invention. In operation, the signals a0 to an (10 to 1n) fed from the function block A110 are latched in a latch 120 by a strobe signal 130. The latched signals are exclusive-ORed with the orthogonal waveforms of the orthogonal waveform generator circuit 100 in the permuters 80 to 8n to become a01 to an' (10' to 1n'). Similarly, the signals b0 to bn (20 to 2n) fed from the function block B111 are latched in a latch 121 by a strobe signal 131. The latched signals are exclusive-ORed with the orthogonal waveforms of the orthogonal waveform generator circuit 101 in the permuters 90 to 9n to become b0' to bn1 (201 to 2n'). The signals a0' to an' (101 to 1n1) and b01 to bn1 (20' to 2n') formed above are compared by the comparison circuits 30 to 3n. The comparison circuits 30 to 3n feed out comparison results c0 to cn (40 to 4n). The comparison results becomes signature outputs 6 through the integrator circuit 5.

The circuit of the embodiment is divided into three areas: an area 0 (200), including the comparison circuits 30 to 3n and the integrator circuit 5, an area 1 (201), including the function block A110, the latch 120, the orthogonal waveform generator circuit 100, and the permuters 80 to 8n, and an area 2 (202), including the function block B111, the latch 121, the orthogonal waveform generator circuit 101, and the permuters 90 to 9n. The areas 0 (200), 1 (201), and 2 (202) can be formed in individual chips. The areas also can be formed in a single chip-In this case, areas 0 (200), 1 (201), and 2 (202) should be arranged to have distances from one another and/or have individual power grounds to prevent a failure from spreading. The circuit construction of the embodiment described above has the advantage that no influence can be caused by generation of a counterfeit signature due to a shortcircuit as the correlated signals ai and bi and the signals pi and ci can be isolated from one another geometrically, physically, and electrically.

In general, it is efficient for designing a highperformance LSI to use a heuristic method of human experiences and intuition for rough layout or floor plan before automatically wiring its details on the basis of a specific algorithm. Accordingly, many existing automatic wiring tools provide features for entering the rough layout or plan by a person and the ones for automatic wiring the details. The method of the embodiment matches with, or is well suited to, the features of the existing automatic wiring tools. This means that the method can make use of the features of the automatic wiring tools to the best advantage.

The embodiment described above can be easily achieved to check itself in the way that the function blocks formed in an ordinary logic design should be copied logically or optically before being combined with the area 0 (200) of the comparison circuits 30 to 3n and the integrator circuit 5. This will not only increase the reliability, but also reduce the number of the development steps and the development cost to a great extent.

Figure 16:
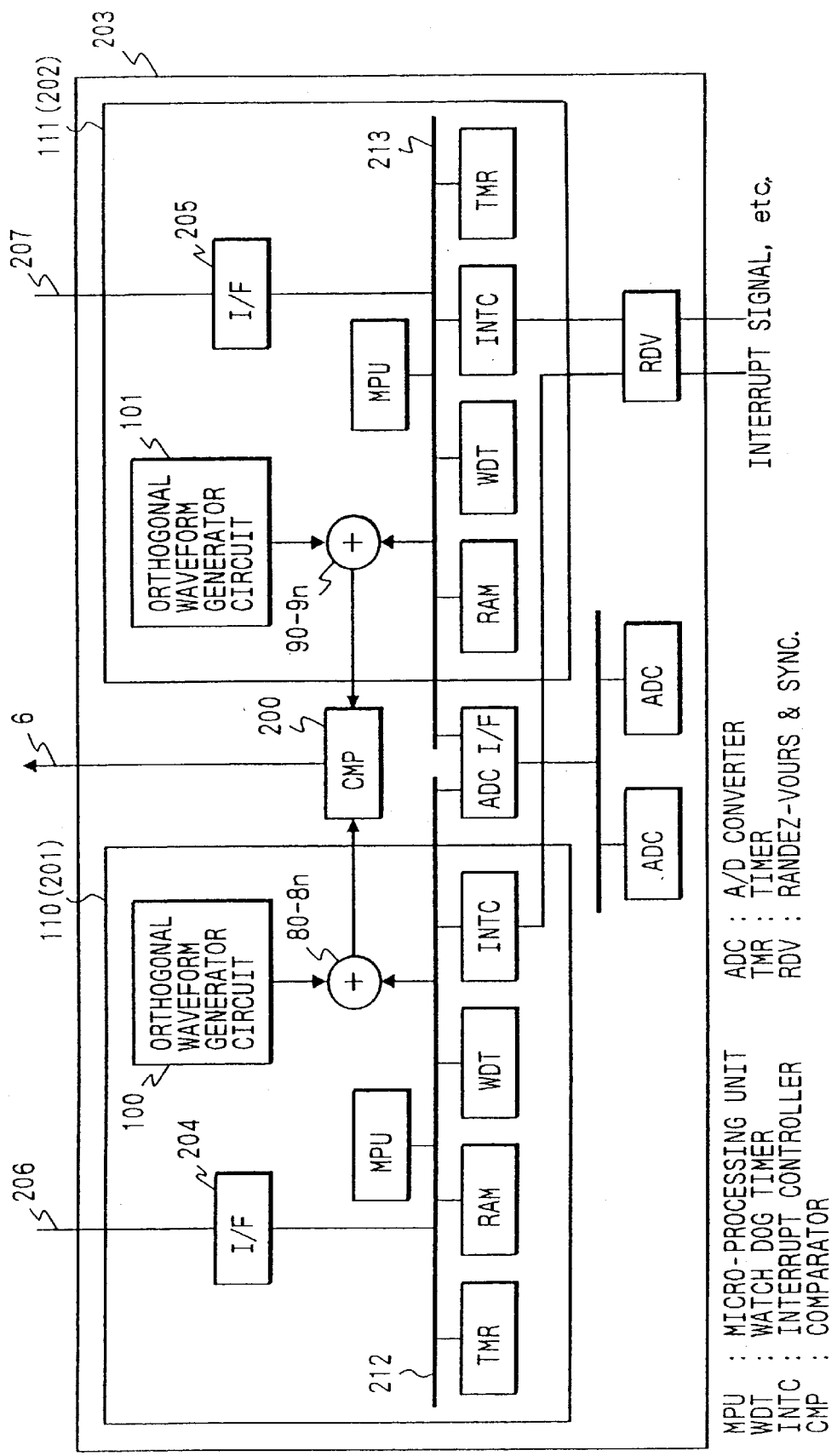
FIG. 16 depicts a block diagram illustrating a self-checking computer according to the present invention.

FIG. 16 depicts a block diagram illustrating a selfchecking computer made up of the present invention. The function blocks A110 and B111 are connected with respective MPUs (microprocessing units), WDTs (watch dog timers), INTCs (interrupt controllers), and other computer elements through respective interface buses 212 and 213. The function blocks also are connected to respective external buses 206 and 207 through respective interfaces 204 and 205. In operation, the comparator of the present invention compares the signals on the internal buses 212 and 213 with the signals having signatures superimposed thereon by the permuters 80 to Bn and 90 to 9n according to the pattern generated by the orthogonal waveform generator circuits 100 and 101 to judge whether or not the function blocks A110 and B111 are normal. If the signals on the internal buses 212 and 213 coincide, the comparator (area 0 (200)) feeds the signature signal out to the signature output signal 6. Further, while a single-chip self-checking microcomputer can be achieved in the way shown in FIG. 16, the function block A110 (area 1 (202)), the function block B111 (area 2 (202)), and the comparator (area 0 (200)) should be isolated from one another according to the layout shown in FIG. 15, and their power grounds should be separated on the single chip. Note that the latches 120 and 121 are omitted in the figure for simplicity.

The comparator (area 0 (200)) can check the signals on the external buses 206 and 207 in addition to the ones on the internal buses 212 and 213. This allows monitoring of all the operations of the whole LSI, including that of the interfaces 204 and 205.

The embodiment described above can be easily achieved to check itself in the way that the function blocks formed of the MPUs (micro-processing units), the WDTs (watch dog timers), the INTCs (interrupt controllers), and other microcomputer elements in an ordinary design should be copied logically or optically at a mask pattern level to duplex before being combined with the area 0 (200) of the comparison circuits 30 to 3n and the integrator circuit 5. This will not only increase the reliability, but also reduce the number of development steps and the development cost to a great extent.

Figure 17:
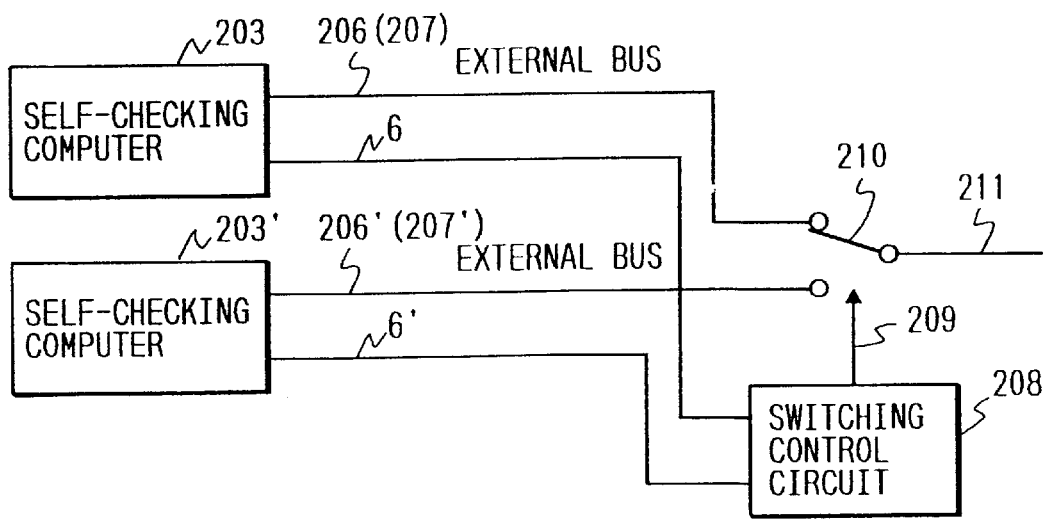
FIG. 17 depicts a circuit diagram illustrating a fault tolerant computer made up of the self-checking computer.

FIG. 17 depicts a diagram illustrating a fault tolerant computer which includes a self-checking computer. In operation, one of the signals fed out of the self-checking computers 203 and 203' to respective external buses 206 (207) and 206' (207') is selected by an output selector circuit 210 and is supplied to a final output line 211. The output selector circuit 210 is controlled by a switching control signal 209 generated by a switching control circuit 208 on the basis of the signature outputs 6 and 6'. That is, the output selector circuit 210 selects the signal output of the self-checking computer regarded as normal on the basis of the signature outputs 6 and 6' fed from the self-checking computers 203 and 203'.

Figure 18:
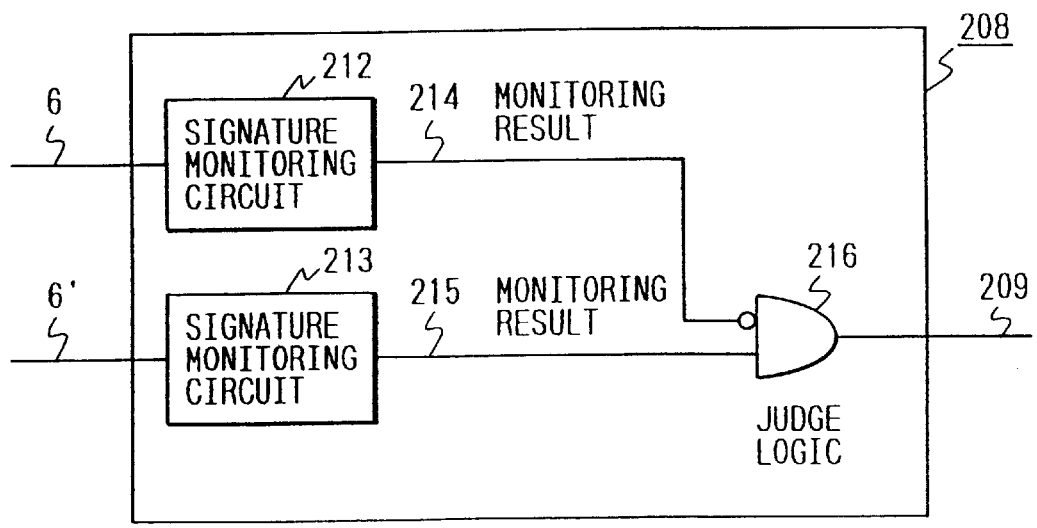
FIG. 18 depicts a circuit diagram illustrating a switching control circuit.

FIG. 18 depicts a block diagram illustrating the switching control circuit 208. In operation, the signature monitoring circuits 212 and 213 monitor the signature outputs 6 and 6'. If the signature outputs 6 and 6' are normal, the signature monitoring circuits feed out 'normal' signals to monitored result lines 214 and 215, respectively. If any of the signature outputs 6 and 61 is abnormal, the signature monitoring circuit feeds out an 'abnormal' signal to the monitored result line 214 or 215. A judge logic device 216 feeds out a signal meaning "select external bus 206' (207')" to the switching control signal 209 only when the signature output 6 is abnormal and the signature output 6' is normal. In the other cases, the judge logic device 216 feeds out a signal meaning "select external bus 206 (207)." For simplicity in the drawings, level H of the binary logic denotes a 'normal' signal on the monitored result line 214 or 215; level L is an 'abnormal' signal; level H also is a signal meaning "select external bus 206' (207')" fed to the switching control signal 209; and level L also is a signal meaning "select external bus-206 (207)." These signals of the present invention are not limited to such binary logic, but can be made in any of various redundant logics, such as two-wire logic (1-out-of-2 code), frequency logic, and the signature provided inherent to every net by the present invention. This can make highly reliable the switching control circuit 208 and the whole system as well.

Figure 9:
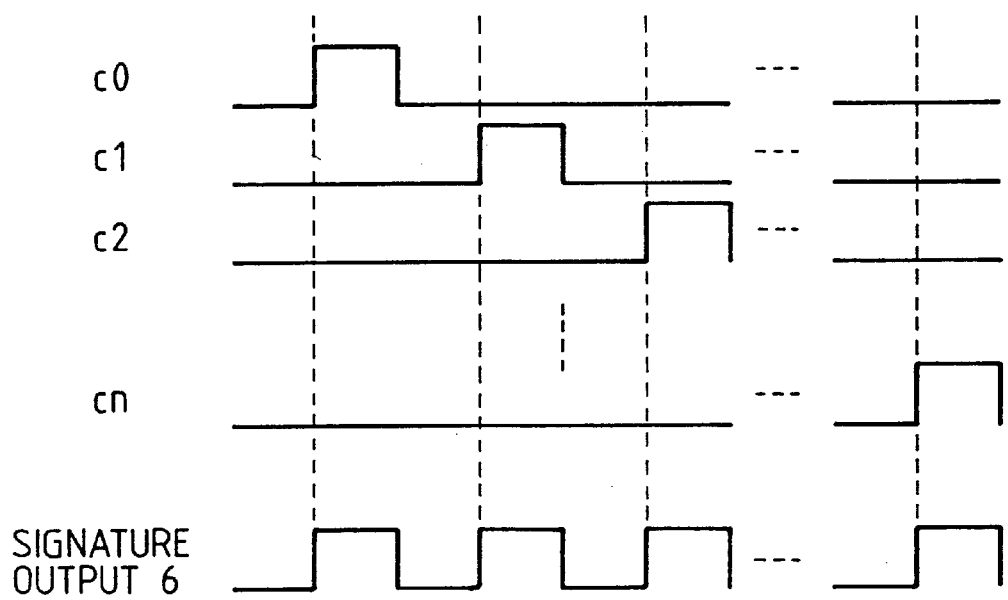
FIG. 9 depicts a timing chart illustrating the orthogonal function waveforms and signature output signal.
Figure 10:
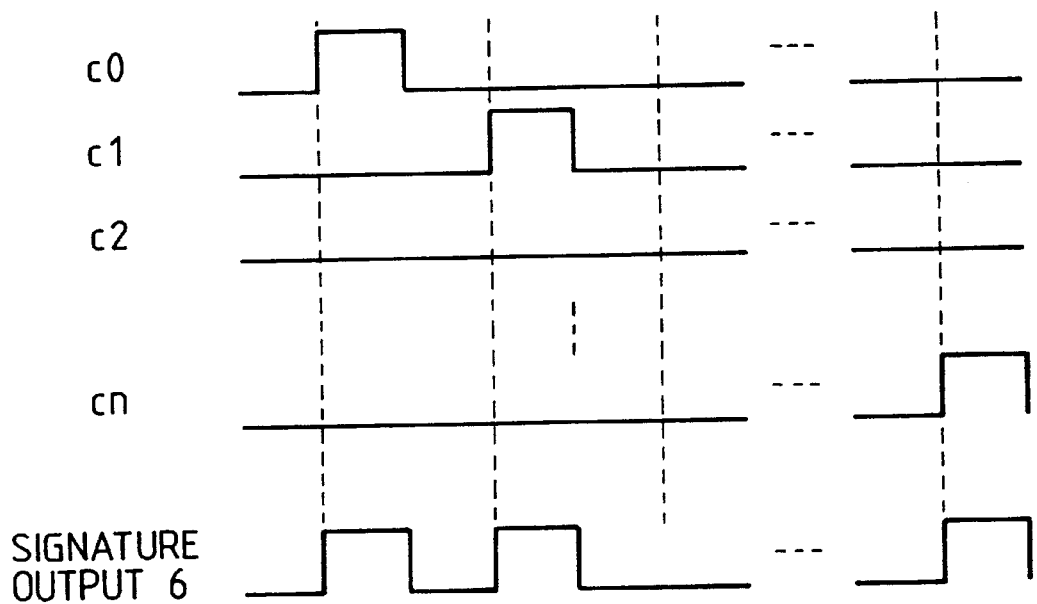
FIG. 10 depicts a timing chart illustrating the orthogonal function waveforms and signature output signal at a time of fault.

The following further describes an embodiment of the signature monitoring circuits 212 and 213. If the signature output signal 6 is a periodic waveform as shown in FIG. 9, the signature monitoring circuits 212 and 213 can be implemented such that a counter is arranged to monitor when a pulse arrives at certain intervals. If the signature output signal 6 is a more complicated waveform, the signature monitoring circuits 212 and 213 can be implemented such that the signature output signal 6 is correlated with a reference (template) waveform, and if the correlation is 1.0, the signature is be judged normal or if the correlation is less than 1.0, the signature is judged abnormal.

With the embodiment described above, we can structure the fault tolerant system to be of the hot standby type having the self-checking computer 203 as a main system and the self-checking computer 203' as a substitute system (standby system). In addition, the detection method of little detection missing provided by the present invention can provide a system of higher reliability than the conventional ones.

The self-checking computers provided by the present invention can be used in fault tolerant systems of various configuration as well as the system configuration described above. For example, the selfchecking computers can be used in the system that the inventors already disclosed in the Japanese Patent Application No. 03-15946 (corresponding to U.S. Pat. No. 5,084,878). This can be accomplished in a way that the subsystems 11 to 1-N shown in FIG. 5 in the Japanese Patent Application should be replaced by the self-checking computer 203 provided by the present invention, the outputs 3-1 to 3-N in the application should be replaced by the external bus 208 (207) of the present invention, and the cross diagnosed results 4-1 to 4-N in the application should be replaced by the signature output 6 of the present invention.

Figure 19:
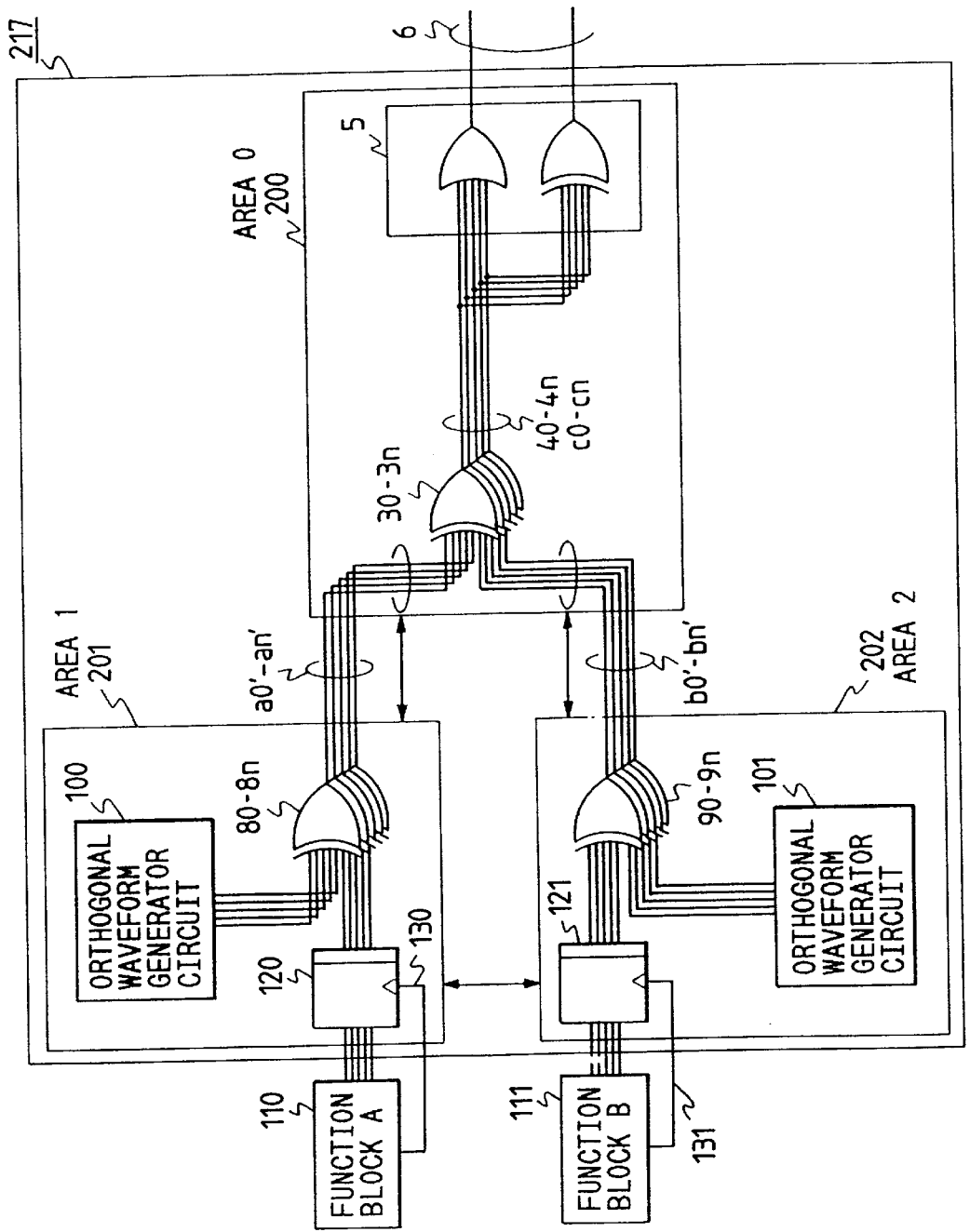
FIG. 19 depicts a circuit diagram illustrating a self-checking comparator according to the present invention.

FIG. 19 depicts a circuit diagram illustrating a self-checking comparator according to the present invention. The comparator 217 is divided into three areas: area 0 (200), area 1 (201), and area 2 (202). Area 0 200 includes the comparison circuits 30 to 3n and he integrator circuit 5. Area 1 (201) includes the latch 120, the orthogonal waveform generator circuit 100, and the permuters 80 to 8n. Area 2 (202) includes the latch 121, the orthogonal waveform generator circuit 101, and the permuters 90 to 9n. Areas 0 (200), 1 (201), and 2 (202) should be arranged to have distances from one another and/or have individual power grounds to prevent a failure from spreading. The circuits of the comparator mentioned above are arranged in a single chip. The comparator 217 is connected with the external function blocks A110 and B111 to compare their outputs. The circuit construction of the embodiment described above, like the embodiment described in FIG. 15, has the advantage that no influence can be caused by generation of a counterfeit signature due to a shortcircuit as the correlated signals ai and bi and the signals pi and ci can be isolated from one another geometrically, physically, and electrically.

The embodiment has the advantage that fail-safe performance can be assured even if a counterfeit signature is generated by a shortcircuit. This means that, to accomplish a fail-safe logic circuit, the present invention needs no special limits, but can take advantage of using existing semiconductor technology and automatic designing tools. It can be expected to reduce both development cost and time to a great extent.

2. Redundancy Resource Management

In turn, the following paragraphs describe the managing method of a redundant resource and the fault tolerant system forming embodiments of the present invention, by referring to FIGS. 20 to 43.

A. Principles of Operation

Figure 23:
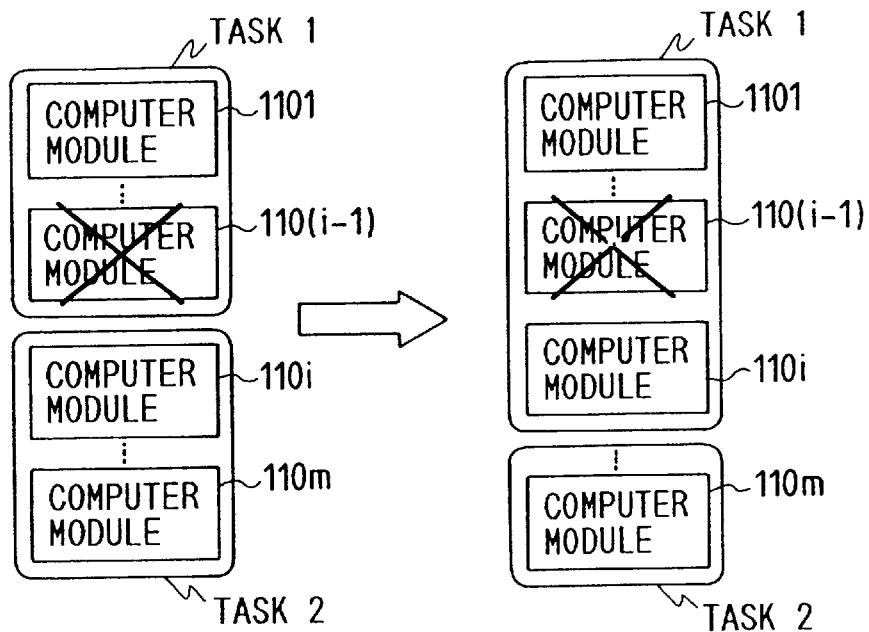
FIG. 23 depicts a diagram of a conceptual outline illustrating an embodiment of the present invention.

FIG. 23 depicts a conceptual outline illustrating an embodiment of the present invention. As an example, it is assumed in the figure that computer modules 1101 to 110(i-1) execute task 1 for redundancy, computer modules 110$i$ to 110$m$ execute task 2 for redundancy, the system cannot run normally because of fault of the computer module 110(i-1). If the system cannot run normally because of a fault of the computer module 110(i-1), the computer module 110i halts the execution of task 2 and starts execution of task 1. This can relax extensive reduction of the number of the computer modules executing task 1 due to the fault of the computer module 110(i-1), thereby preventing a large reduction of reliability of task 1.

Figure 24:
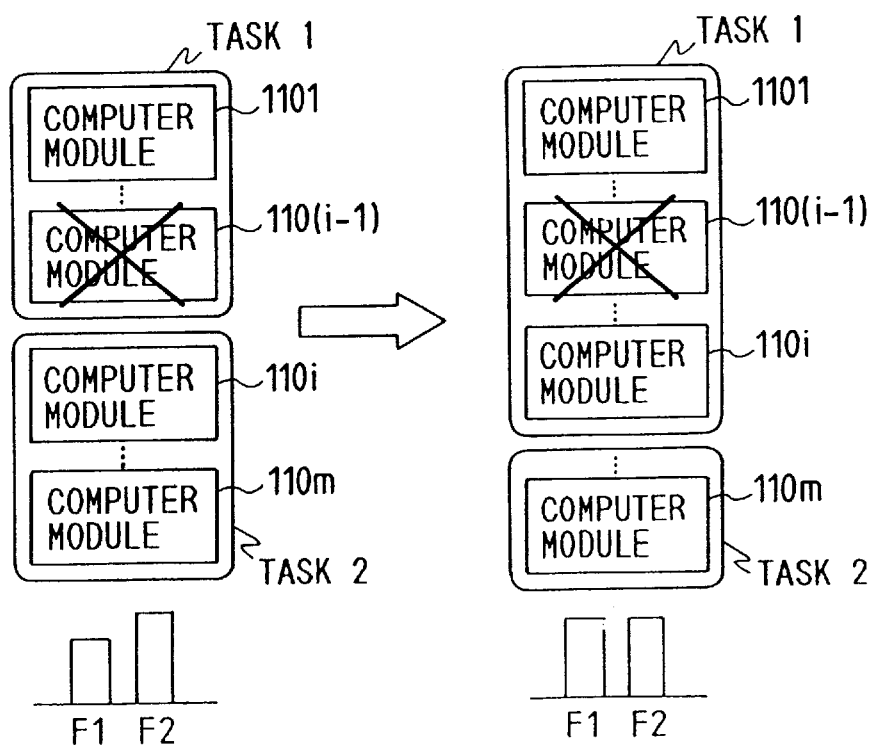
FIG. 24 depicts a diagram of a conceptual outline illustrating another embodiment of the present invention.

FIG. 24 depicts a conceptual outline illustrating an embodiment of the present invention in which evaluation functions F1 and F2 are introduced to judge task switching of the computer module 110$i$ in FIG. 23. It is assumed that the evaluation functions F1 and F2 are the ones that reflect the reliabilities of tasks 1 and 2, respectively. A method of determining the evaluation functions will be described later. On the left in the figure, the evaluation function F1 (reliability) is made lower than F2 as a fault occurs in the computer module 110(i-1) executing task 1. Then, as shown on the left in the figure, the computer module 110$i$ of the computer modules executing task 2 is added to execute task 1 so that the evaluation functions F1 and F2 become virtually equal. If the evaluation functions are made to greatly differ with occurrence of a fault, a determination as to which computer module should change its executing task is made in a way that the responsibilities of each computer module are set for the tasks in advance. In the embodiment, 38 among the computer modules 110$i$ to 110$m$ executing task 2, the computer module 110$i$ has the highest responsibility for task 1.

If the hardware for performing the redundant resource managing features, including the task changing feature and the judgement feature, is not made redundant but is single, it may happen a that fault of the hardware prevents the whole system and the redundant resource managing features as well from normally running. To avoid this, it is necessary to make the hardware itself redundant for performing the redundant resource managing features. There are three methods for making it redundant.

(1) A method of adding and making redundant exclusive hardware to carry on the redundant resource managing features, and (2) A method of using a plurality of ones of the computer modules 1101 to 110(i-1) to carry on the redundant resource managing features and to judge which computer module should change its executing task, and (3) A method of having the redundant resource managing features to make the computer modules 1101 to 110(i-1) judge and execute the task by themselves.

The method (1) can be accomplished by having a plurality of hardware and/or software for achieving the redundant resource managing features shown in FIGS. 23 and 24. The method (2) can be accomplished in a way that the tasks for making the redundant resource managing features shown in FIGS. 23 and 24 should be allotted to a plurality of computer modules and like the other tasks, to be subjected to the redundant resource managing features. In turn, an embodiment of the method (3) is described below.

Figure 25:
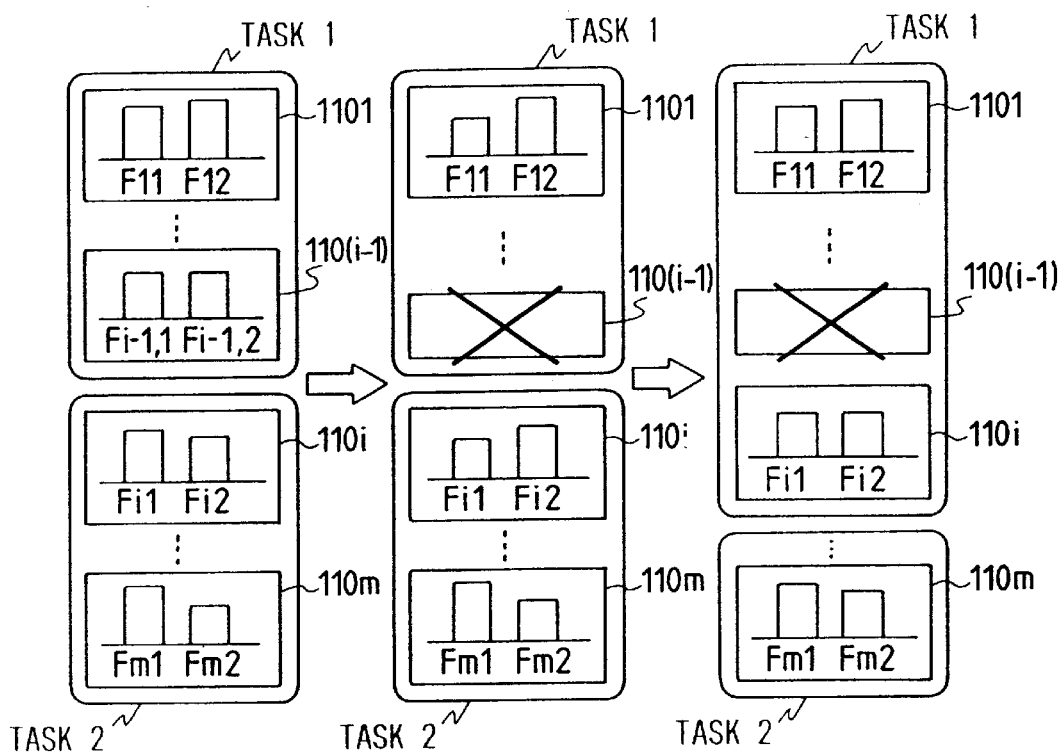
FIG. 25 depicts a diagram of a conceptual outline illustrating another embodiment of the present invention.

FIG. 25 depicts a conceptual outline illustrating the embodiment of the method (3) in which each of the computer modules can independently judge by itself whether or not it should be added to execute the task of a low evaluation function if the evaluation functions are made to differ greatly with the occurrence of a fault. The computer modules 1101 to 110$m$ calculate their respective evaluation functions Fij, where i is a processor number and j is a task number. Each of the evaluation functions Fij should be defined so that it is made lower as the computer module has a higher responsibility for task j. In other words, the evaluation function Fij can be regarded as a margin for the responsibility to be taken on by the computer module for the task. In FIG. 25, for example, the computer modules 1101 to 110$m$ bear a high responsibility for task 1 and a low responsibility for task 2 in that order. Therefore, even if all the computer modules are normal, as shown on the left in FIG. 25, the evaluation functions are F11<F21<1101 to 110(i-1), and it holds that Fij<Fi2. For the computer modules 110$i$ to 110$m$, it'holds that Fi1<Fi2 holds. The computer modules therefore execute their tasks 1 and 2, respectively.

If a fault occurs in the computer modules 110(i-1) as shown on the center in FIG. 25, all the computer modules are lowered in Fi1, the computer module 101$i$ is reverted in the relationship of value between Fi1 and Fi2, that is, Fi1<Fi2. Therefore, the computer module 110$i$; as shown in the center in FIG. 25, halts execution of task 2 by its own independent judgement before starting task 1. As described above, the embodiment makes each of the computer modules independently change its task by its own judgement. The embodiment therefore has a so-called manager in which the redundant resource managing features are concentrated for the whole system. This means that the embodiment has no single fault point as a bottleneck in increasing the reliability, thus being capable of increasing the dependability of the redundant resource managing features themselves.

The embodiments described above by referring to FIGS. 23 to 25 have only two tasks, tasks 1 and 2, used in the system as an example for purposes of simplicity. Of course, the embodiments can manage the redundant resource also for any number of tasks as desired.

As for selections of results of calculation by redundant computer modules for tasks, they can be made by decision of majority or the method that the inventors already disclosed in the Japanese Patent Application No. 1-288928.

B. System Configuration

Figure 20:
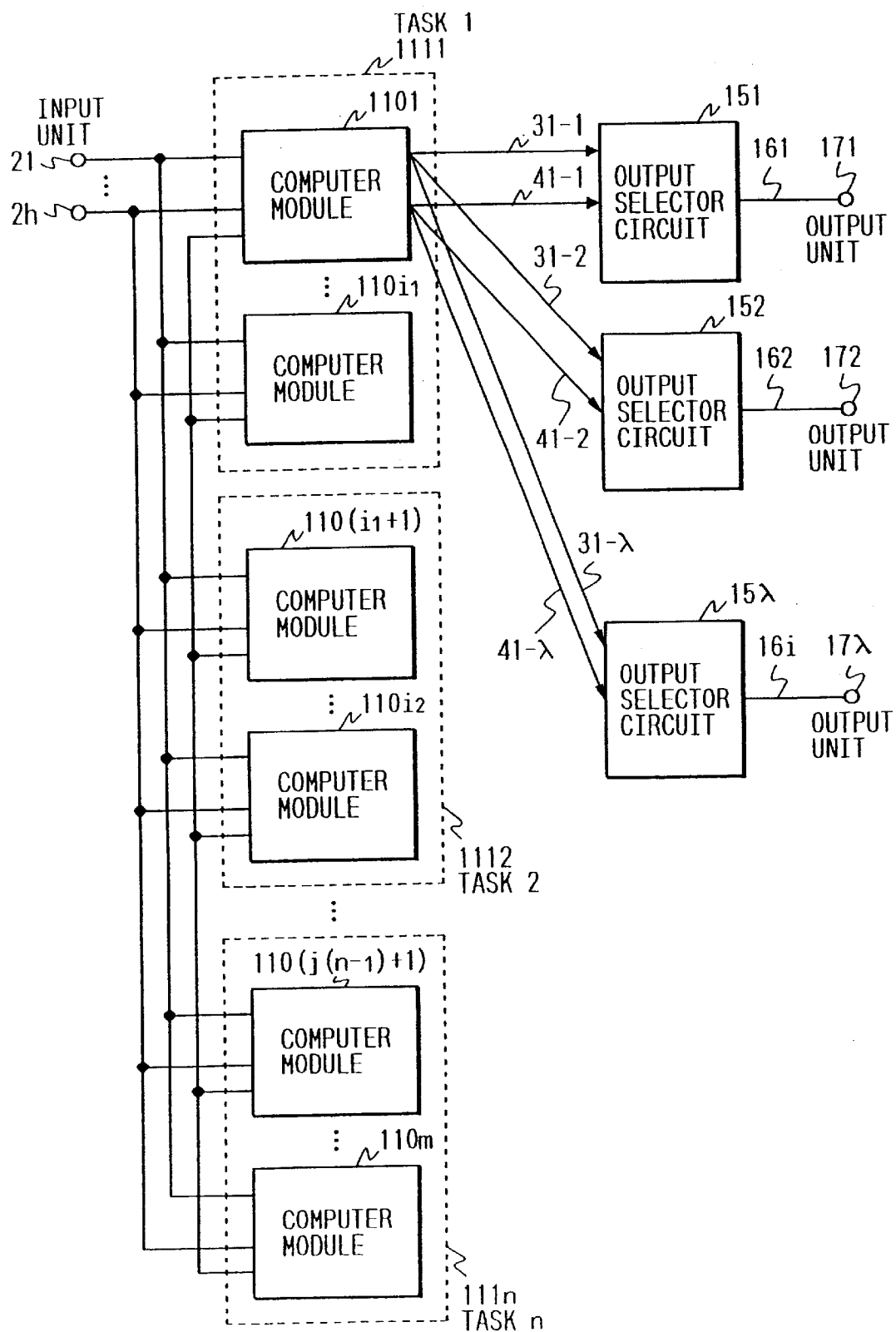
FIG. 20 depicts a block diagram illustrating a configuration of a fault tolerant system according to the present invention.

FIG. 20 depicts a block diagram illustrating a system configuration to accomplish the present invention. The system of the present invention is formed of m numbers of computer modules 1101 to 110m having the same functions. Tasks 1111 to 111n have a plurality of computer modules assigned thereto to execute them redundantly for highly reliable operation. In the example shown in FIG. 20, i1 numbers of the computer modules 1101 to 110i1 are assigned to task 1 (1111), (i2−i1) numbers of the computer modules 110(i1+1) to 110i2 are assigned to task 2 (1112), and ($i_{n+1}$−m) numbers of the computer modules 110 ($i_{n+1}$+1) to 110m are assigned to task n(111n).

Each of the computer modules 1101 to 110m can feed out signals to output selector circuits 151 to 15λ. Note that the signals 31-1 to 31-λ to 3m-1 to 3m-λ are fed out to the output selector circuits 151 to 15λ for the computer modules 110-1 to 110-m, respectively. Also, the computer modules 110-1 to 110-m feed out selection control signals 41-1 to 41-λ to 4m-1 to 4m-λ to the output selector circuits 151 to 15λ together with the output signals 31-1 to 31-λ to 3m-1 to 3m-λ.. The selection control signals 41-1 to 41-λ to 4m-1 to 4m-λ indicate whether or not the output signals 31-1 to 31-λ to 3m-1 to 3m-λ should be selected by the output selector circuits 151 to 15λ. If the computer module 1101 is normal and feeds out the signal 31-3 to the output selector circuit 151 to have that signal fed out thereto, for example, the selection control signal 41-1 is turned on.

The figure has only the output signals 31-1 to 31-λ and the selection control signals 41-1 to 41-λ indicated therein, but omits the output signals 32-1 to 32-λ to 3m-1 to 3m-λ and the selection control signals 42-1 to 42-λ to 4m-1 to 4m-λ..

The output selector circuits 151 to 15λ decide the signals to be fed out on the basis of the selection control signals 41-1 to 41-λ to 4m-1 to 4m-λ.. The signals becomes outputs 161 to 16λ. Note that the outputs 161 to 16 are connected to output units 171 to 17λ. Also, note that in many control units, the output units 171 to 17λ use electrical and hydraulic actuators to control subjects.

For the output selector circuits 151 to 15λ is available the MV (modified voter) that the inventors already disclosed in FIG. 2 in the Japanese Patent Application No. 1-288928.

Figure 21:
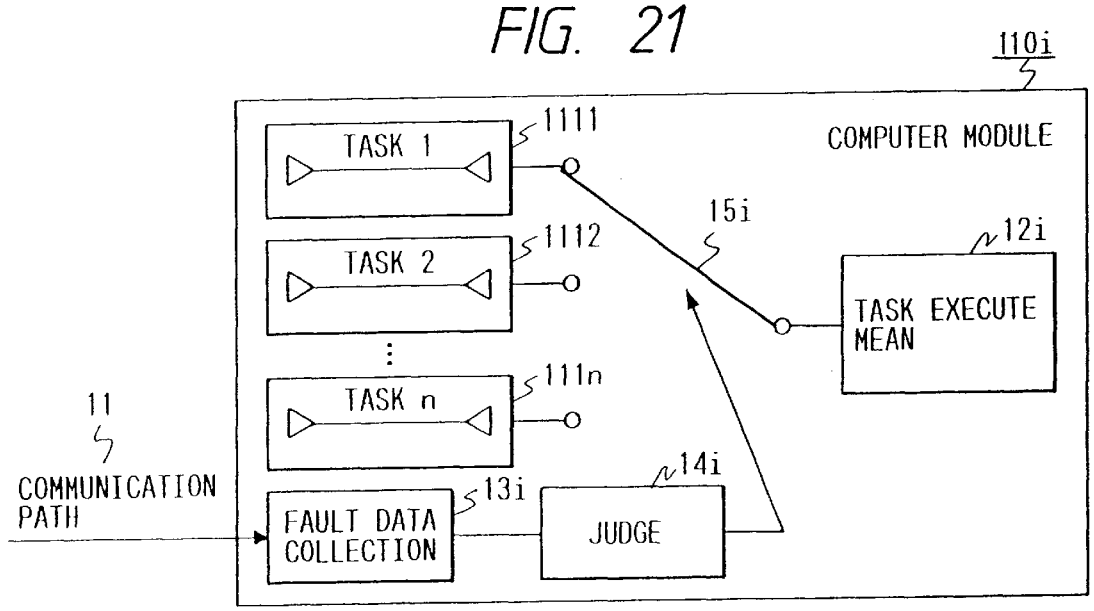
FIG. 21 depicts a diagram of a conceptually functional outline illustrating a configuration of a computer module of the present invention.

FIG. 21 depicts a conceptually functional outline illustrating a configuration of the computer module 110i to embody the present invention. The computer module 110i has a task executing device 12i, a fault data exchanging feature 13i, a judging feature 14i for deciding a task to be executed, and a task changing feature 15i. These are to select and execute the task to be executed from among task 1 (1111) to task n (111n) on the basis of a judgement result by the judging feature 14i. In the embodiment shown in the FIG. 21, the computer module 1101 executes task 1 (1111).

The fault data exchanging feature 13i broadcasts a fault occurrence situation in its own computer module and the process results of the executed task to other computer modules via a communication path 11. At the same time, the feature collects the fault occurrence situations broadcast by the other computer modules and the process results of the executed task.

Previously proposed methods of communicating with the other computer modules via the communication path 11 include the method of message passing, the method of shared memory, and the method of memory bank switching. Previously proposed forms of the communication path 11 include the bus type, the net type, and ring type.

Figure 22:
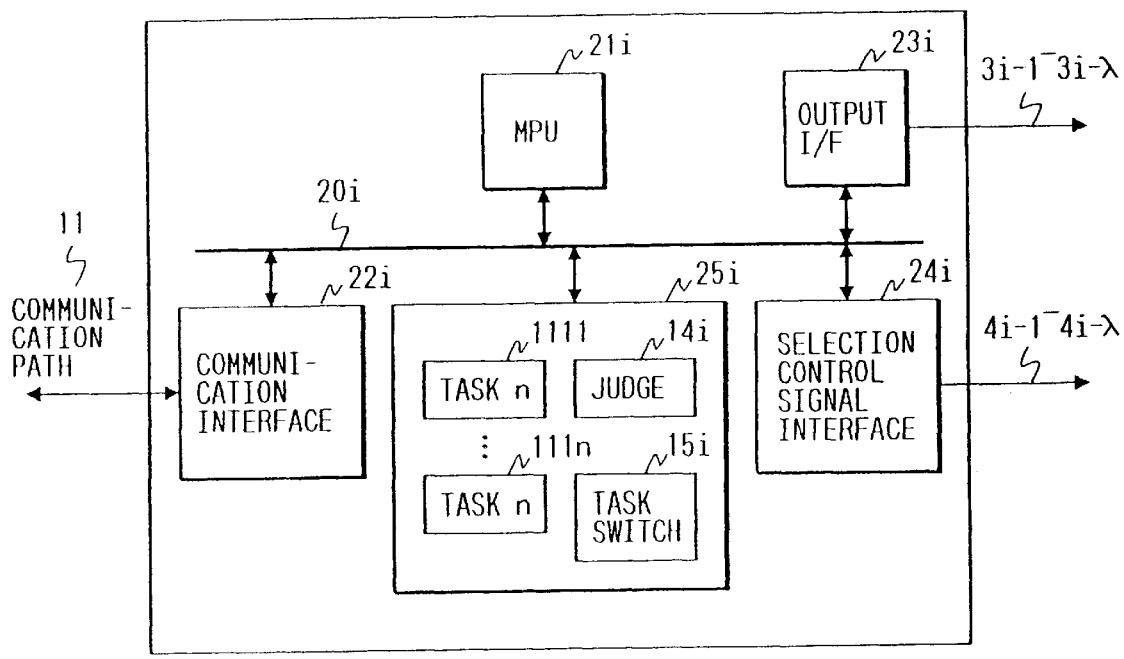
FIG. 22 depicts a diagram of a conceptually functional outline illustrating another configuration of the computer module of the present invention.

FIG. 22 depicts a block diagram illustrating a configuration of the computer module 110i to embody the present invention. A bus 20i in the figure is connected with an MPU (micro-processing unit) 21i, a communication interface 22i, an output,interface 23i, a selection control signal interface 24i, and a memory unit 25i. The communication interface 22i is connected with the other computer modules via the communication path 11 for communication with any of them. The fault data exchanging feature 13i in the figure is accomplished through the selection control signal interface 24i.

An output interface 23i is a circuit for feeding out signals 3i-1 to 3i-λ to the output selector circuits 151 to 15λ. The signals can be transferred either in a parallel or serial way depending on use. If the output interfaces 23i are arranged to feed out their respective independent signals 3i-1 to 3i-λ, they can be used for an application in which a plurality of output units are used simultaneously.

The selection control signal interface 24i is a circuit for feeding out selection control signals 4i-1 to 4i-λ to the output selector circuits 151 to 15λ. The MPU 21i can be used to write at a register of the selection control signal interface 24i to turn on, or select, any desired one of the selection control signals 4i-1 to 4i-λ. Conditions for turning on, or selecting, the selection control signal 4i-λ', where λ' is an integer of 1 to λ, include a. The computer module 110i executes a task of feeding out the signal 3i-1' to the output selector circuit 151'; and b. The computer module 110i regards the executing task as normal.

For a method of judging whether condition b is normal or abnormal reference is made to the one that the inventors already disclosed in the Japanese Patent Application No. 1-288928.

If the computer module 1101 executes task 1 that is normal and feeds out a signal to the output selector circuit 151, and a fault occurs in the other computer module 110-i that executes task 2 that feeds out the signal to the output selector circuit 152, and if the computer module 110i bears the highest responsibility for task 2, then the computer module 110i halts execution of task 1 before starting task 2. In that event, the selection control signal 41-1 from the computer module 1101 to the output selector circuit 151 that is on during execution of task 1 is turned off at the end of execution of task 1. At the start of execution of task 2, the selection control signal to the output selector circuit 152 is turned on. Further, the selection control signal 4i-2 from the computer module 110-i to the output selector circuit 152 that is on is turned off at the instance when a fault occurs. As a result, after the fault occurrence, the output selector circuit 152 can select the output signal 32-1 from the computer module 1101 as an output signal 162 to be fed to an actuator 172, while before the fault occurrence, the output selector circuit 152 selects the output signal 32-i from the computer module 110-i executing task 2 normally as the output signal 162 to be fed to the actuator 172.

As described above, the embodiment of the present invention can use a plurality of computer modules to execute a plurality of tasks in parallel and in a redundant way.

In the above description, it was assumed that a single task feeds out a signal to a plurality of actuators. A1-go, it can be assumed that a single task feeds out a signal to a plurality of actuators or that no tasks will feed out a signal to the actuators at all.

C. Calculation and Decision Algorithm of Evaluation Functions

Figure 26:
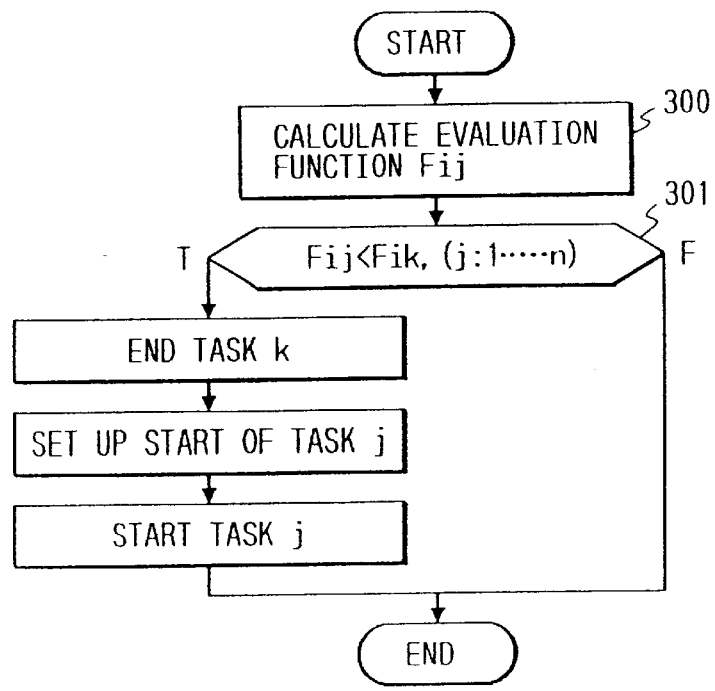
FIG. 26 depicts a flow chart illustrating condition judgement features that decide a task to be executed by 1b the present invention.

FIG. 26 depicts a flow chart illustrating decision features 14-1 to 14-m that determine a task to be executed by the present invention.

An evaluation function calculation step 300 in the figure calculates an evaluation function Fij, where j is a task number, for the given task.

As mentioned previously, the evaluation function Fij represents a margin of reliability of the task. Therefore, it should be determined so that Fij can be low as importance of the task is high, Fij can be low as responsibility of the computer module for the task is high, and Fij can be high as the reliability of the task is high. That is, $\partial Fij/\partial I<0$, $\partial Fij/\partial Resp<0$, and $\partial Fij/\partial Rel>0$, where I is the importance, Resp is the responsibility, and Rel is the reliability.

An example of the evaluation function Fij meeting the conditions mentioned above is $$Fij=Lrj-Lthij \tag{6}$$

where Lthij is a threshold value of the reliability level of task j in the computer module i, Lrj is the reliability level of task j, i is the computer module number, and j is the task number.

It should be noted which Lthij that is the threshold value of the reliability level of task i is different depending on the importance of the task. It is set to a high value as the task is needed to have high importance or high reliability. Further, if all the computer modules have the same value of Lthij set thereto, they all execute the same task at occurrence of a fault. This results in unstable system operation. Therefore, Lthij has to be different depending on the computer module. It has to be high as the responsibility of the computer module is high for the task. That is, $\partial Lthij/\partial I>0$, and $\partial Lthij/\partial Resp>0$.

The following describes how to determine the reliability level Lrj of a task j. The evaluation function that is the reliability level Lrj should be calculated in terms of fault data based on fault detection results, including the number of the computer modules executing task j, equality and inequality of the process results, and the number of processors having equal process results.

First, take note of a probability that wrong results are used as outputs of the system. Then, the reliability level Lrj can be calculated in terms of the degree of accepted checks. Where N1 numbers of computer modules are executing task j, if N2 numbers of computer modiales are judged normal as checked and if calculation results of N3 numbers of computer modules coincide, then the probability Pej of wrong calculation results of task j is $$Pej=P\epsilon^{N1} \times Ped^{N2} \times Pea^{N3-1} \tag{7}$$

where $P\epsilon$ is the probability of error occurrence, Ped is a probability of checking failure of error, and Pea is a probability of accidental coincidence of wrong calculation results. Note that as $P\epsilon$, Ped, and Pea are known constants that can be obtained in terms of the system operation environment and error detection method, and Pej is a function of N1, N2, and N3−1.

The reliability level of task j that is a probability of correct calculation results is given by $$Lrj=1-Pej \tag{8}$$

Let Lrj be evaluated by magnitude of Pej in Eq. 8 for simplicity. Logarithm is taken for Eq. 7 is $$\log(Pej)=N1 \times \log(P\epsilon)+N2 \times \log(Ped)+N(3-1) \times \log(P\epsilon a) \tag{9}$$

As the values of $P\epsilon$, Ped, and Pea can be calculated by means of field data or simulation, let logarithms of the values be represented by K1, K2, and K3. Eq. 9 can be simplified as $$\log(Pe)=N1 \times K1+N2 \times K2+(N3-1) \times K3 \tag{10}$$

Also, take note of the probability Pe of wrong calculation results in place of the evaluation function in Eq. 6. Let the evaluation function Fij be defined as $$Fij=\log\{(1-Lthij)/Pe\} \tag{11}$$

Then, $$Fij=K4\ N1 \times K1+N2 \times K2+(N3-1) \times K3 \tag{12}$$

where K4=log(1−Lthij). Thus, the evaluation function Fij can be calculated only by addition, subtraction, and multiplication simply, or at a high speed.

Similarly, the reliability level Lri of task j can be calculated by taking note of the probability of error occurrence in the computer modules executing task j.

Assuming that N1 numbers of computer modules are executing task j, the probability of wrong calculation results of task j with error occurring in all the computer modules is $$Pe=P\epsilon^{N1} \tag{13}$$

We can obtain a logarithm of Eq. 13 before processing it, like Eq. 7, as $$Fij=K4-N1 \times K1 \tag{14}$$

Thus, the evaluation function Fij can be simplified as above.

A condition judgement step 301 in the figure compares the evaluation functions Fij of tasks with the evaluation function Fik of task k executed currently, where j is 1 to n and n is the number of tasks. As a result, if there is a task j meeting Fij<Fik, task k executed currently is ended and task j is started.

Figure 27:
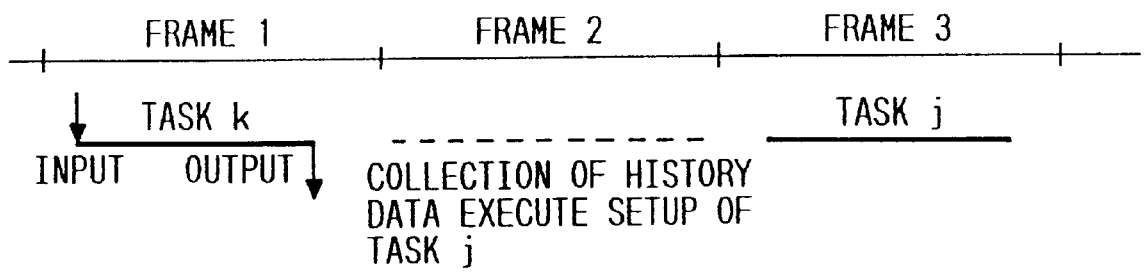
FIG. 27 depicts a timing chart illustrating instants of switching a task.

FIG. 27 depicts a timing chart illustrating instants of the end of task k and the start of task j. As for a computer for feedback control, as in FIG. 27, it reads input data periodically for every control frame before executing the task to feed out results. Let the computer module i execute task k, and assume that Fij<Fik is made by fault occurrence in the computer module executing task j in a control frame 1. The computer module i ends task k instantly before starting preparation for executing task j. If the data (history data,) until the preceding control frame are not needed to start task j, the computer module i can start task j from control frame 2. If the history data are needed to start task j, on the other hand, as in FIG. 27, the computer module i uses a control frame 2 to collect the history data before starting task j from a control frame 3. Note that the history data can be collected by request through the communication path 11 to the computer module already executing task j.

εD. Setting Dead-Zone to Prevent Hunting

Figure 28:
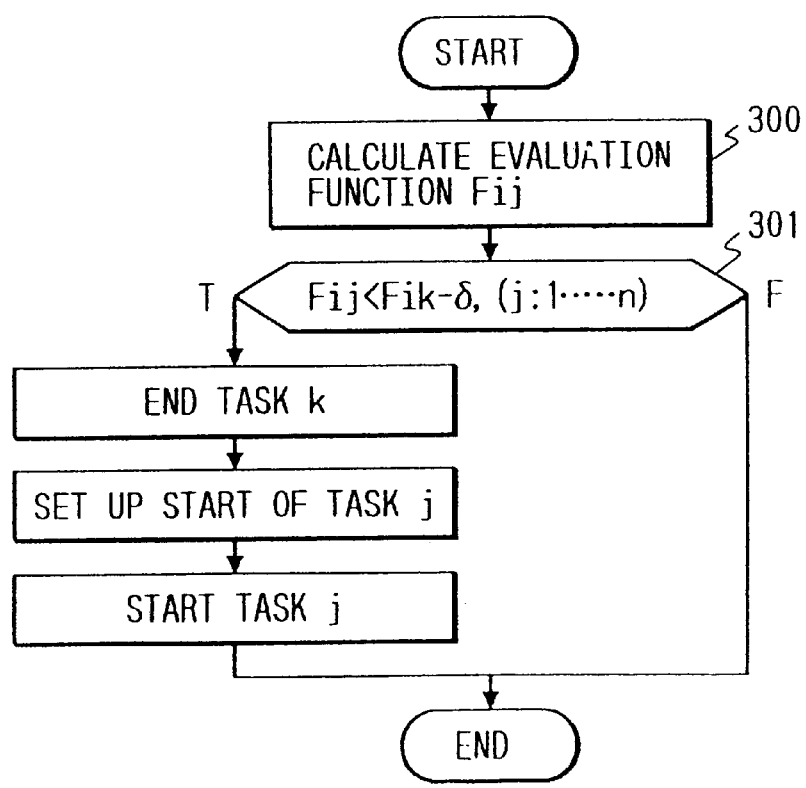
FIG. 28 depicts a flow chart illustrating condition judgement features having a dead-zone that decide a task to be executed by the present invention.

FIG. 28 depicts a timing chart illustrating an embodiment having a dead-zone 6 provided for judgement in the condition judgement step 301. In the figure, if there is a task j meeting Fij<Fik−6, task k executed currently is ended before task i is started. The embodiment in the figure further improves the operation of the one in FIG. 26.

Figure 29:
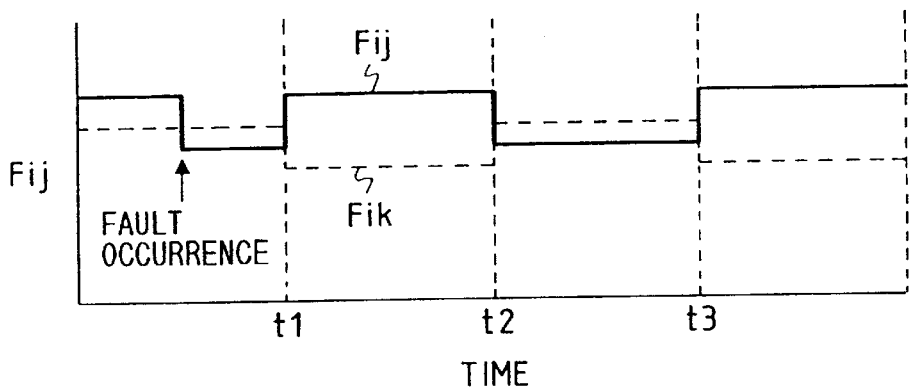
FIG. 29 depicts a timing chart illustrating a change of Fij without a dead-zone.

In the embodiment in FIG. 26, as shown in FIG. 29:

(1) Fault occurrence makes Fij<Fik. If the computer module executing task k starts execution of task j at instant t1, the evaluation function Fij becomes high, while the evaluation function Fik becomes low.

(2) If Fij and Fik are inverted in magnitude to make Fij>Fik, the computer module having started execution of task j starts-task k at instant t2 again.

As a result of repetition of operations (1) and (2) above, it is probable that the operational efficiency of the system will be lowered by collection of history data and other operations.

Figure 30:
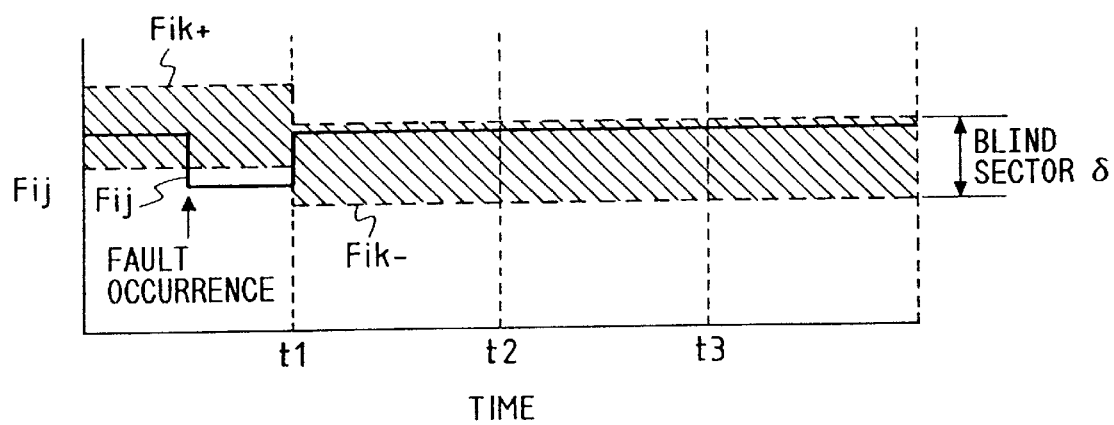
FIG. 30 depicts a timing chart illustrating a change of Fij with a dead-zone.

To overcome such a problem, as shown in FIG. 28, there is provided a dead-zone that is greater than changes of Fij and Fik at the instant of task switching for the judgement in the condition judgement step 301. The dead-zone 6 is to provide a hysteresis characteristic that allows the system to run stably as shown in FIG. 30 without occurrence of hunting at the instant of execution of task switching.

As P$\epsilon$, P$\epsilon$d, and P$\epsilon$ea are known, we can see in advance changes of Fij, including $\partial Fij/\partial N1$, $\partial Fij/\partial N2$, and $\partial Fij/\partial N3$, with changes of N1, N2, and N3. Accordingly, we should set a wider dead-zone $\delta$ than max ($\partial Fij/\partial N1$, $\partial Fij/\partial N2$, $\partial Fij/\partial N3$).

Figure 31:
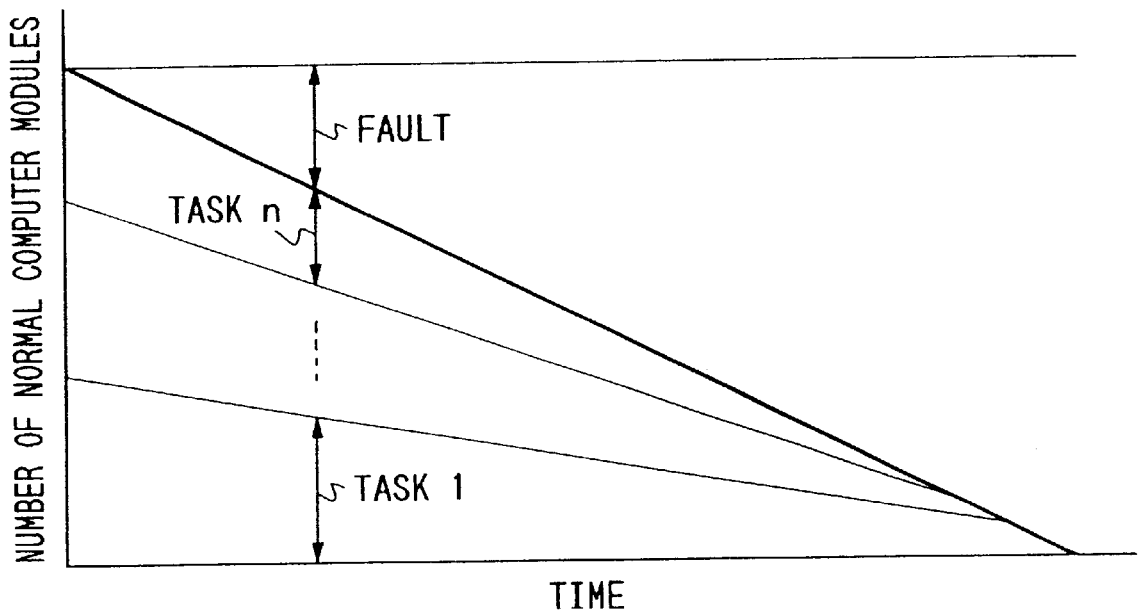
FIG. 31 depicts a graph illustrating number of normal computer modules assigned with time.

With the embodiments described above in FIGS. 20 to 30, as shown in FIG. 31, we can see that the system can produce a balance among the redundancies of the tasks according to the reliability levels required for the tasks in such a way that the computer modules are successively assigned to tasks 1 to n. The balance can be kept even if fault occurrence causes the computer modules forming the redundant system to be continually lost with time. Also, the embodiments assign more redundant computer modules as the task having high importance is needed to have high reliability so that the coverage of fault detections can be increased.

E. Time Averaging to Increase Stability

Figure 32:
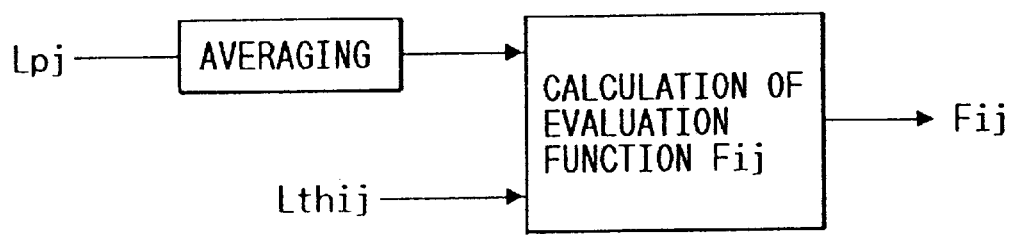
FIG. 32 depicts a block diagram illustrating an embodiment of averaging Lrj.
Figure 33:
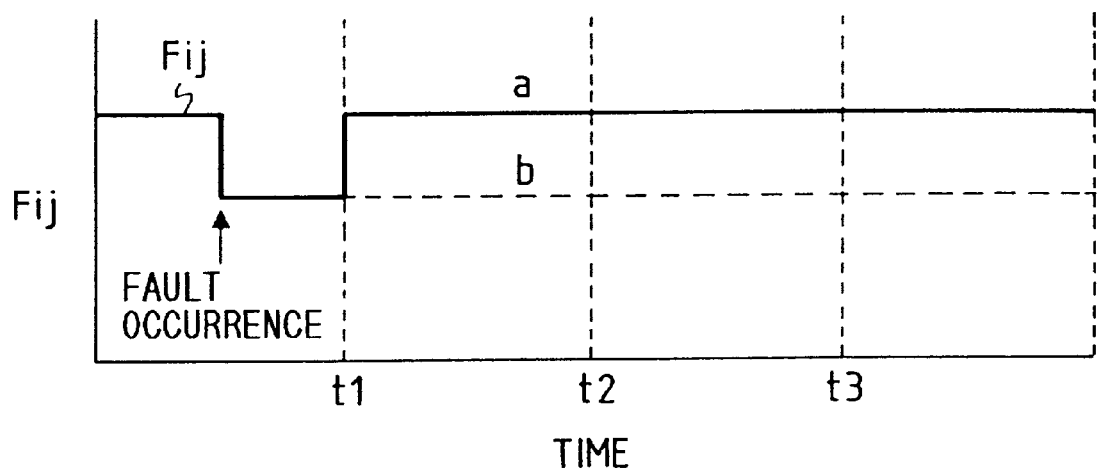
FIG. 33 depicts a timing chart illustrating a change of Fij without averaging Lrj.
Figure 34:
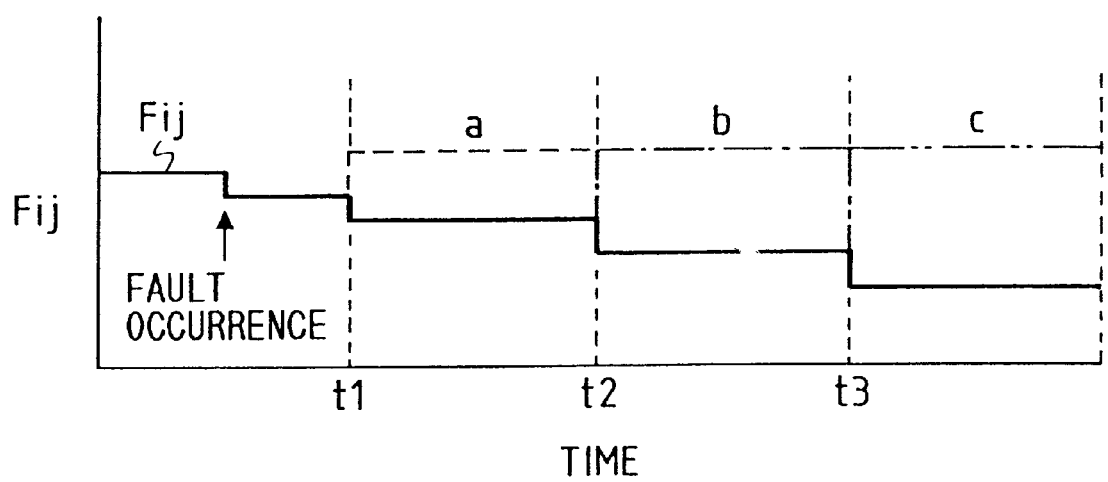
FIG. 34 depicts a timing chart illustrating a change of Fij with averaging Lrj.

The system stability can be further increased by addition of an embodiment shown in FIG. 32 to the ones in FIGS. 20 to 31.

FIG. 32 depicts a block diagram illustrating an embodiment for averaging Lrj or Pe with time while the evaluation function Fij is calculated.

The embodiments in FIGS. 20 to 31 can make the computer module start execution of task j to hold Fij<Fik in the computer module i having the highest Lthij, or bearing the highest responsibility for task j, among the computer modules executing task k, if a fault occurs in the computer modules executing task j. This can keep the reliability level of task j as indicated by solid line a in FIG. 33. If even the computer module i is at failure in that operation, there are no computer modules to start execution of task j newly. This results in the reliability level of task j being left low as indicated by dotted line b in FIG. 33. In other words, the fault of the computer module i affects results of the redundant resource management, thereby lowering the stability of the system.

To overcome such a problem, as shown in FIG. 32, Lrj or Pej should be averaged over a period of time while the evaluation function Fij is calculated. This can gradually lower Fij with time as indicated by the solid line in FIG. 34. If there exists a computer module i bearing the highest responsibility for task j, as indicated by the dotted line a in FIG. 34, the computer module i can start execution of task j at the instant t1, thereby restoring the value of Fij. If there exists no computer module i, but there is a computer module i' bearing the second highest responsibility for task j, as indicated by dotted line b in FIG. 34, the computer module i' can start execution of task j at the instant t2, thereby restoring the value of Fij. If there exists no computer module i, nor computer module i' but there is a computer module i" bearing the third highest responsibility for task j, as indicated by dotted line c in FIG. 34, the computer module i" can start execution of task j at the instant t3, thereby restoring the value of Fij.

Methods of averaging Lrj or Pe with time include:

(1) A method of motion averaging, and (2) A method of use of the K'th delay of which transfer function $G(s)=1/(1+Ts)^K$.

The embodiment has an advantageous capability such as increasing the fault tolerance of the tolerant resource method itself. The advantage is accomplished in such a way that a fault of the specific computer modules bearing high responsibilities for the task can be made to reduce the effect on the results of the redundant resource management.

F. Reducing Amounts of Communications and Calculations

Figure 35:
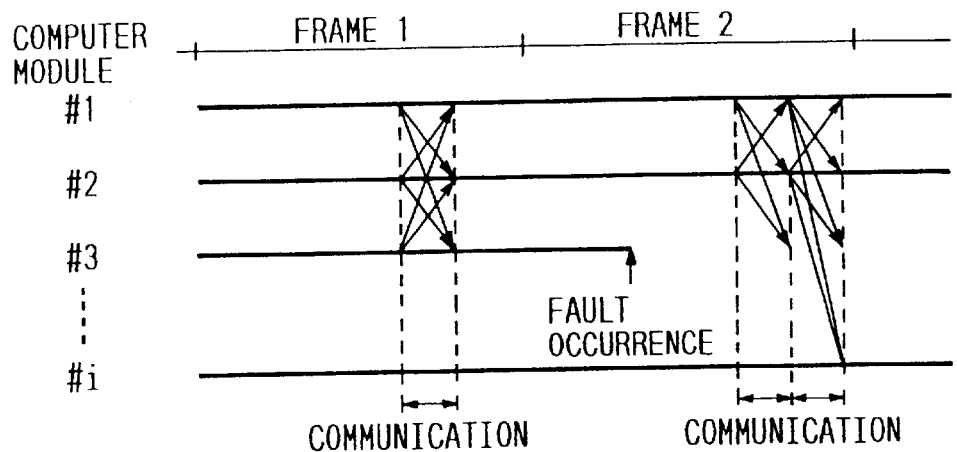
FIG. 35 depicts a timing diagram illustrating an embodiment of the present invention for relaxing increases of amount of communications among the computer modules.

FIG. 35 depicts a timing diagram illustrating an embodiment of the present invention for relaxing increases in the amount of communications among the computer modules 1101 to 110m and of calculations of the evaluation functions. In the embodiments described in FIGS. 20 to 34, it is necessary to perform Ncom {=m(m 1)} communications so that the own computer module has to notice, or broadcast, its fault detection situation to all the other computer modules. This increases the amount of communications to a great extent. To solve such a problem, as shown in FIG. 35, the evaluation function fault detection situation is ordinarily noticed only to the computer module executing the same task. Only if the evaluation function Fij changes, in which is noticed to all the other computer modules. As an example, let us examine an operation that the computer modules 1 to 3 execute task 1, while the computer module i executes task 2. A control frame 1 does not find any abnormality in the computer modules 1 to 3. Communication is made only among the computer modules 1 to 3. In turn, let us inspect a case in which a control frame 2 finds a fault in the computer module 3. The first communication is made among the computer modiales 1 to 3. The evaluation function Fij calculated on the basis of the fault detection information exchanged through the communication is lower than the preceding one (control frame 1) because of the fault in the computer module 3, which is silent. The control frame 2 therefore proceeds to the second communication to send a notice to the computer module i that the evaluation function Fij is lowered. The computer module i judges whether or not its own computer module should participate in execution of task 1. If so, it halts execution of task 2 before starting execution of task 1.

The number of times of communication among the computer modules in the example is given by $$Ncom' = \sum_{j=1}^{n} Nlj \cdot (Nlj - 1) \quad (time) \qquad \text{eq. 15}$$

where Nij is the number of the computer modules executing task j. In Eq. 15, $$\sum_{j=1}^{n} Nlj = m, \quad Nlj = m/n \qquad \text{eq. 16}$$

The number of times of communication in the example becomes Ncom'/Ncom/n, which is near 1/n.

Figure 36:
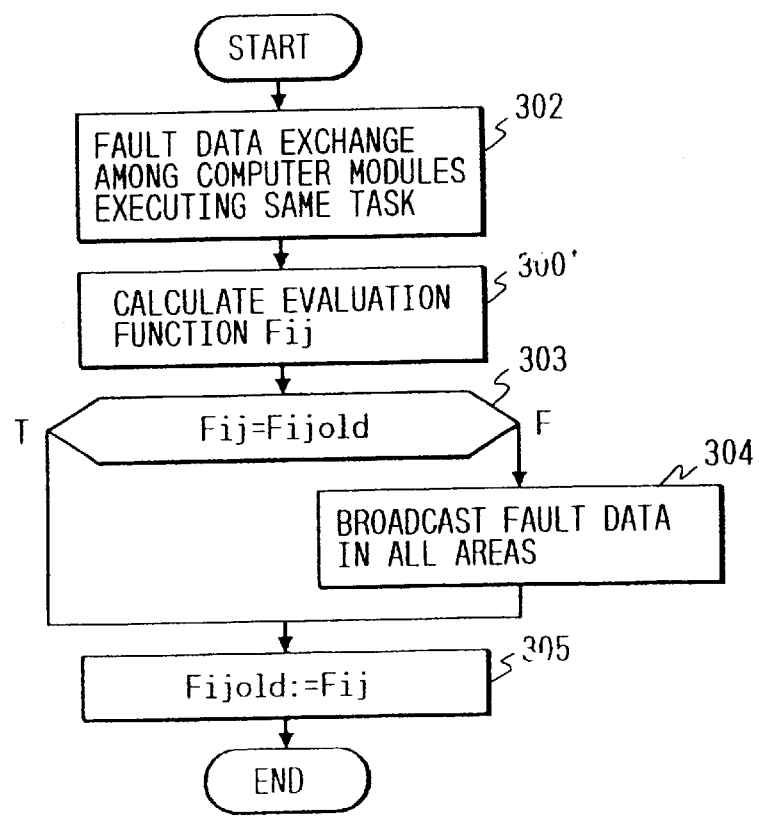
FIG. 36 depicts a flow chart illustrating a judgement whether or not broadcasting should be performed.

FIG. 36 depicts a flow chart illustrating the judgement carried out to determine whether or not broadcasting should be made to all the computer modules for the embodiment in FIG. 35. First, at step 302, the computer modules executing the samb task exchange fault detection information among one another. At step 300', on the basis of the information exchange, the evaluation functions Fij are calculated. Note that the calculations of the evaluation functions Fij at step 300' are for computer modules executing the same task. This is different from the ones for all the computer modules at step,300 in FIGS. 26, 28, and 37. Step 300' for calculations of the evaluation functions Fij should calculate Fij only according to the number (0 (m/n)) of the computer modules executing the same tasks, while step 300 for calculations of the evaluation functions Fij is needed to calculate Fij by m times. This means that the amount of calculations can be reduced nearly to 1/n. After the calculations of the evaluation functions Fij at step 3001, step 303 compares the present values of Fij with the preceding ones of Fijold. If they are not equal, step 304 broadcasts fault information to all the computer modules. Finally, step 305 stores the present values of the evaluation functions Fij to variables Fijold to prepare for the next time.

Figure 37:
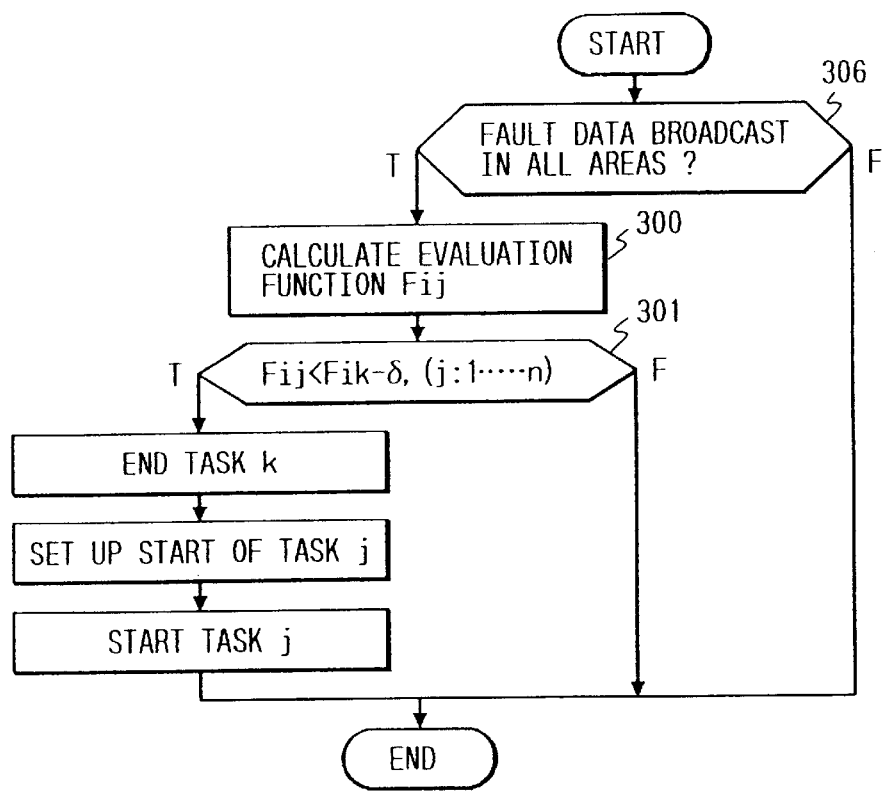
FIG. 37 depicts a flow chart illustrating another judgement whether or not broadcasting should be performed.

On the other hand, the computer modules which have received the broadcast, as shown in FIG. 37, judge at step 306 whether or not the broadcast is to all the areas. Only if it is to all the areas will the step go to the judgement in FIG. 26 or 28.

G. Application to an Adaptive-Control System

Figure 38:
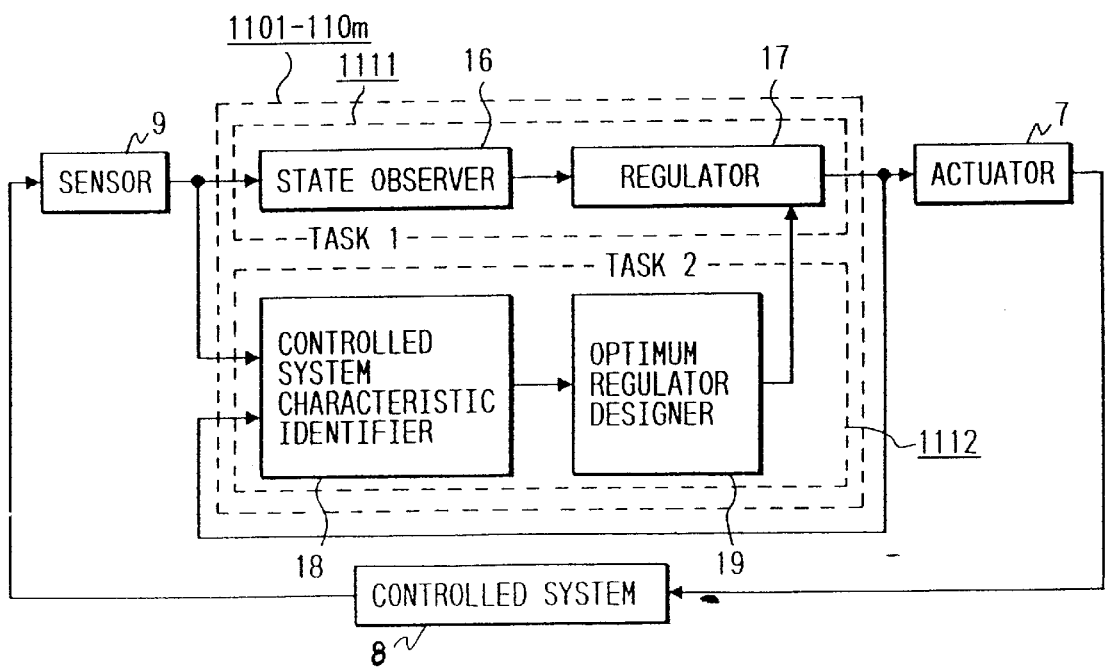
FIG. 38 depicts a block diagram illustrating an embodiment of the present invention for application to 1b an adaptive-control system.

FIG. 38 depicts a block diagram illustrating an embodiment of the present invention for application to an adaptive-control system. In the embodiment, a sensor 9 measures a physical quantity of a controlled system B. A status viewer 16 observes, or estimate, the status of the controlled system 8. On the basis of the observed status, then, it feeds back to the controlled system 8 via a regulator 17 having adequate controlling characteristics and an actuator 7. The embodiment described above is a typical configuration of a controlling system of the state feedback type based on a modern control theory.

Further, a controlled system characteristic identifier 18 signifies characteristics of t he controlled systems 8, including the sensor 9 and the actuator 7, in terms of signals input to the sensor 9 and the actuator 7. An optimum regulator designer 19 calculates parameters for the regulator 17 optimum to effect control in terms of identification results of characteristics of the controlled system 8. The designer 19 then sets the parameters for the regulator 17 to optimum values. The adaptive-control system described above can increase the control characteristics. In particular, the system is known to be optimum for controlling a controlled system as its characteristics change apparently with altitude and speed in a linearly approximated controlling system by non-linear aerodynamic characteristics of airplanes and a space shuttle. Further, even if a fault occurs in the Co'n@rolled system 8, the sensor 9, or actuator 7, the control system recognizes it as a characteristic change of the controlled system. Whenever it happens, the control system can set an optimum parameter to the regulator 17 so that the characteristic deterioration due to the fault of the controlled system can be compensated. In general, control systems which demand high reliability have the actuators duplexed. In an airplane, for example, a control surface, including an elevator and a rudder, and a thrust generator are made redundant so that the airplane can fly without trouble even if parts break down. However, if the parts of the actuators made redundant break down, the gains of the actuators decrease equivalently. This means that the control characteristics of the whole system are deteriorated. In some cases, controlled values interfere with each other. This makes very difficult controlling through manual operations. To solve this problem, the adaptive-control system of the embodiment has the characteristic identifier 18 to detect a gain decrease in the actuator 7. The optimum regulator designer 19 determines optimum parameters for the regulator 17. This can compensate for the deterioration of the control characteristic performance.

The application of the present invention to the adaptive-control system in the embodiment is accomplished in the following way. The status viewer 16 and the regulator 17 are formed of task 1 or task group 1. The controlled system characteristic identifier 18 and the optimum regulator designer 19 are formed of task 2 or task group 2. Setting is made as Lth11>Lth21>Lth31>Lth41>Lth51, and
Lth12<Lth22<Lth32<Lth42<Lth52, and
Lth11>Lth52 and Lth21>Lth42, and
Lth31>Lth32 and Lth41>Lth22 and Lth51>Lth11.

Figures 39, 40:
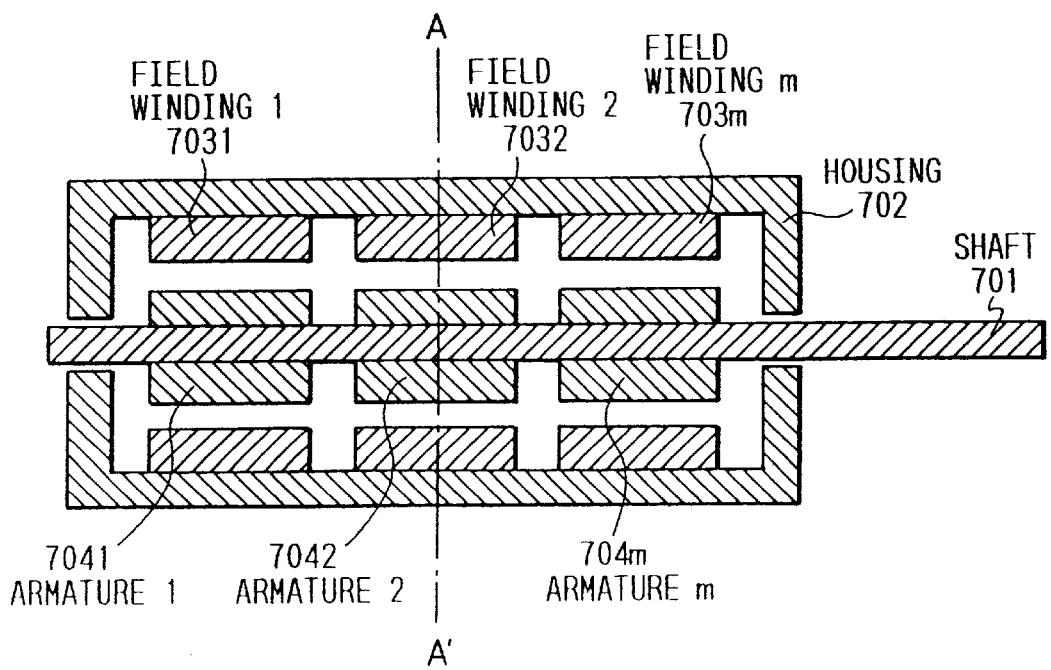
FIG. 39 depicts a table illustrating how the computer modules are assigned.
FIG. 40 depicts a cross-sectioned view illustrating a servo-motor system as an embodiment of the present invention.

If there exists no computer module for executing task 2 or task group 2, a table of numbers is prepared in advance to set the parameters for the regulator 17. FIG. 39 depicts a table illustrating how the embodiment can manage the redundant resource. First, five computer modules are normal, three computer modules are assigned to task 1 or task group 1 and two computer modules are assigned to task 2 or task group 2. If one computer module breaks down leaving four normal computer modules, two computer modules are assigned to task 1 or task group 1 and two computer modules are assigned to task 2 or task group 2. If two computer modules break down leaving three normal computer modules, two computer modules are assigned to task 1 or task group 1 and one computer module is to task 2 or task group 2. If three computer modules break down leaving two normal computer modules, two computer modules are assigned to task 1 or task group 1 and no computer modules are assigned to task 2 or task group 2. Alternatively, the table of numbers prepared in advance is used to set the parameters for the regulator 17 to continue control.

As described above, the embodiment can configure the control system such that it can not only allow a fault in the computer modules, but also a fault of the controlled system. This advantage can increase the reliability of the whole control system.

Figure 41:
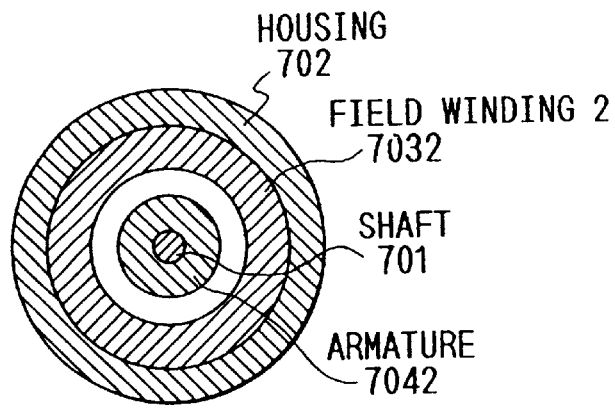
FIG. 41 depicts a longitudinally sectioned view taken along line A–A' in FIG. 40 illustrating the servomotor system.
Figure 42:
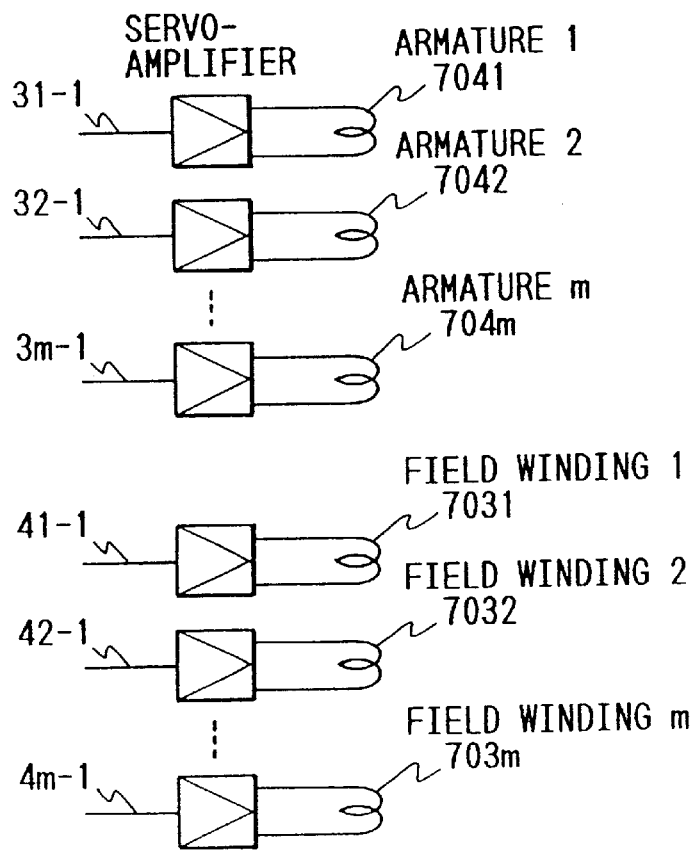
FIG. 42 depicts a circuit diagram illustrating a circuit for the servo-motor system.

FIGS. 40, 41, and 42 depict a cross-sectioned view, a longitudinally sectioned view, and a circuit diagram illustrating a servo-motor system having features of output selection and decision of majority as an embodiment of the present invention, respectively. The servo-motor system provides both capabilities of the output selector circuits 151 to 152 and the output units 171 to 17λ in FIG. 20. The servo-motor in the embodiment, as shown in FIG. 40, has a plurality of armature windings 7041 to 704m provided on a single shaft 701 in a housing 702. The servomotor also has a plurality of field windings 7031 to 703m corresponding to the armature windings facing the armature windings. A cross-sectional view taken along line A–A' in FIG. 40 is shown in FIG. 41. An output torque of the servo-motor is given by $$T = \sum_{i=1}^{1} K \cdot Ifi \cdot Iai \qquad \text{eq. 17}$$

where Ifi is a current flowing through the field winding 703i, Iai is a current flowing through the armature winding 704i, and K is a proportion coefficient.

If all of Ifi are made constant, then
where K' is a proportion coefficient equal to K×Ifi.

$$T = \sum_{i=1}^{1} K1 \cdot Iai \qquad \text{eq. 18}$$

If Ifi is entered, it is possible to make an operation similar to a decision of majority (hereinafter referred to as a para-decision of majority). If the value of each Ifi is made to proportional to the reliability of the input Iai, a weighted para-decision of majority can be obtained as shown in Eq. 17. FIG. 42 depicts a circuit diagram illustrating a circuit for making the weighted para-decision of majority with use of the servo-motor system having the para-decision of majority in FIGS. 40 and 41. The circuit shown in the figure is able to provide the capabilities of the output selector circuit 151 and the output unit 171 in FIG. 20. The same circuits are used for those of the output selector circuits 152 to 15λ and the output units 172 to 17λ. To the armature windings 7041 to 704m and the field windings 703m to 7031 are supplied currents in proportion to the signals 31-1 to 3m-1 and the selection control signals 41-1 to 4m-1 from the computer modules 1101 to 110m through servo-amplifiers, respectively. Such a scheme can accomplish the decision of majority of the signals 31-1 to 3m-1 from the computer modules 1101 to 110m regarded as normal by the selection control signals 41-1 to 4m-1. Further, the servo-amplifiers, the armature windings 7041 to 704m, and the field windings 7031 to 703m can be multiplexed to prevent the system from malfunctioning due to difficulty of the servo-amplifiers or a shortcircuit or break of the windings, thereby increasing the reliability of the servo-motor system.

Figure 43:
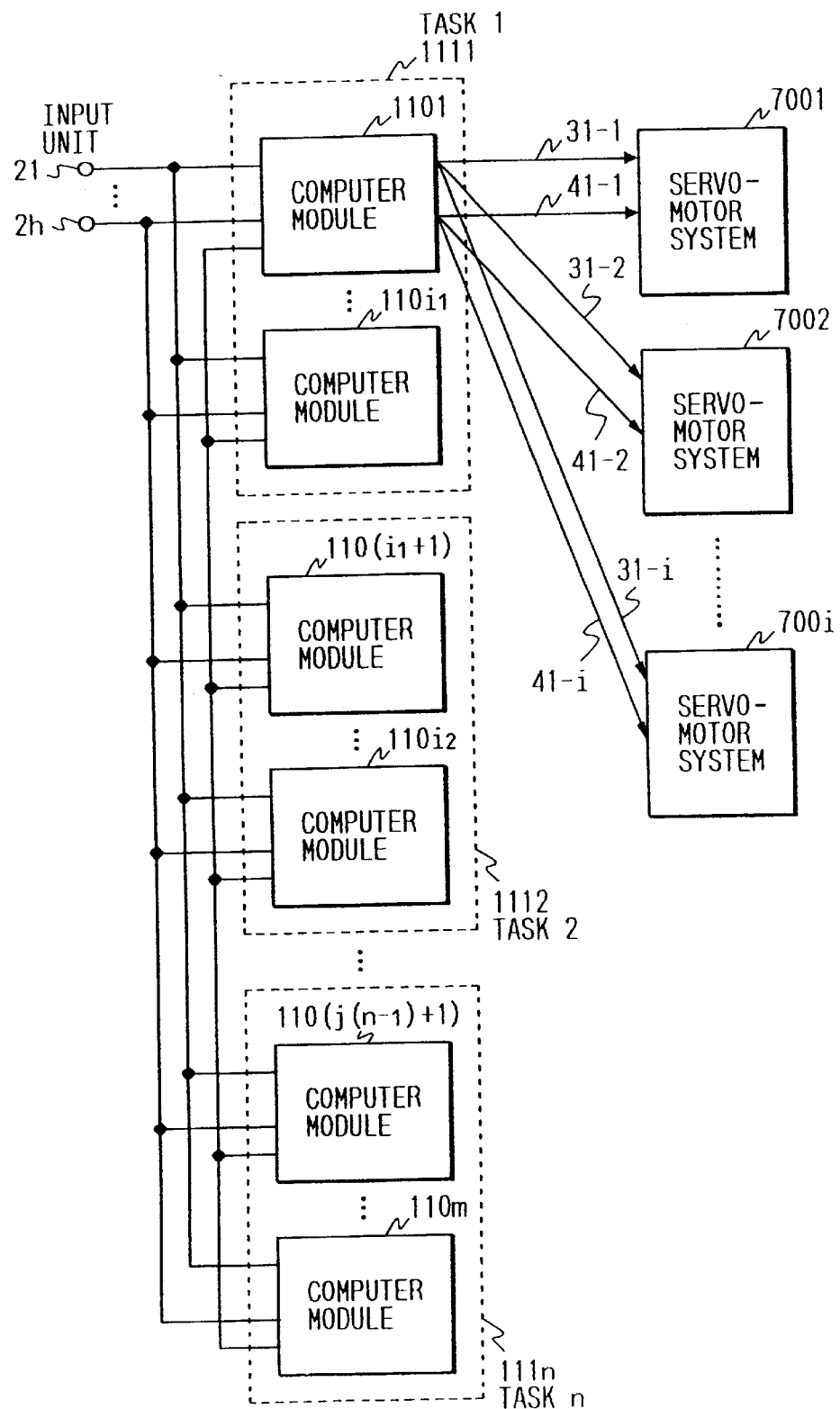
FIG. 43 depicts a block diagram illustrating a system configuration in use for the servo-motor systems.

Also, the selection control signals 41-1 to 4m-1 can be multivalued corresponding the reliabilities of the computer modules, including the two values of on and off, to accomplish the weighted para-decision of majority. FIG. 43 depicts a block diagram illustrating a system configuration for use in servomotor systems. Such a system can be accomplished by replacing the output selector circuits 151 to 15λ and the output units 171 to 17λ in FIG. 20 by the servo-motor systems 7001 to 700λ, respectively. As described above, the embodiment has the advantage that the whole system configuration can be simplified, made small, and have a reduced number of component parts to increase the reliability, since the servo-motor systems can accomplish the features of the output selector circuits 151 to 15λ and the output units 171 to 17λ in FIG. 20. We can see that Ifi and Iai in Eq. 17 can be exchanged for each other. Therefore, the same effect can be obtained even by supplying the current in proportion to the signals 31-1 to 3m-1 from the computer module modules 1101 to 110m to the field windings 7031 to 703m and the selection control signals 41-1 to 4m-1 to the armature windings 7041 to 704m, respectively.

The embodiment of the present invention described above can increase the redundant resource processing performance and reliability an adequate number of redundant resources can be assigned according to the reliable levels needed for the tasks.

Further, by applying the present invention to the adaptive-control system, the embodiment can configure the control system so that it can not only allow a fault in the computer modules, but also a fault in the controlled system. This advantage can increase the reliability of the whole control system.

3. Diversities

These embodiments are especially intended to provide self-checking logics as stated in section 1.

Furthermore, by taking means called diversities as shown below, faults to be detected in any of at-least one of dualized function blocks can be prevented from affecting the other function block, thereby improving the effectiveness of the embodiments. The method to provide such diversities, to be explained below, can be combined with the self-checking comparison circuit 217 provided by Japanese Patent Laid-Open No.27664/1994, which is described in the previous section, effectively to product a self-checking logical circuit or system. Of course, it can also be combined with other technologies to build a high reliability system such as a self-checking system, fault tolerant system, fail-safe system, etc.

(1) Design Diversity

Design diversity is a means effective to eliminate the influence of faults caused by designs. In this regard, N-Version Programming for software is well known. N-Version Programming is a method to execute N versions of a program that are developed with the same specifications concurrently. Also in case of hardware, this design diversity can be materialized by developing circuits with the same specifications in N ways. According to the method mentioned above, however, the number of processes and expenses needed exceed by N times that of an ordinary method for design and development. Thus, this approach is not effective.

To reduce the number of processes and the expense in designing hardware, therefore, the following method is adopted in accordance with this invention.

Figure 44:
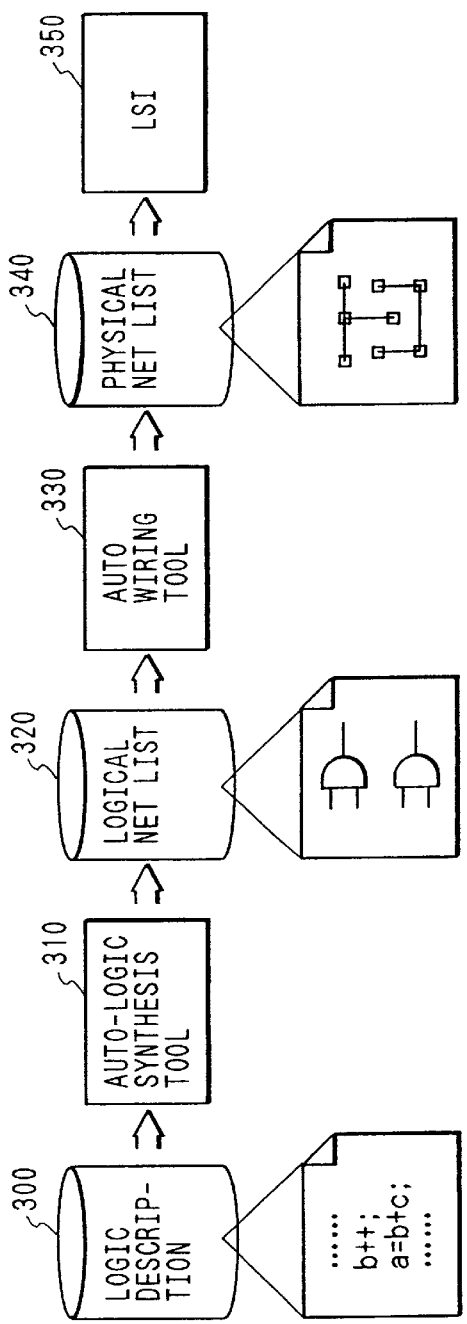
FIG. 44 is a diagram showing a design automation by automatic logical synthesis tool and automatic wiring tool.

As shown in FIG. 44, the main approach to the design of modern hardware is using the HDL (Hardware Description Language) first to create a file (logical description) 300 that describes the functions and specifications of the subject logical circuits and then creating another file (logical net list) 320 that describes the connections of the said logical circuits using a logical synthesis tool 310 on the basis of the logical description 300. In addition, the said logical net list file 320 is converted to a (physical net list) file 340 that describes the wiring and layout of transistors on the actual semi-conductor chip using an auto wiring tool to create the necessary masks and manufacture semiconductor elements (350).

Figure 45:
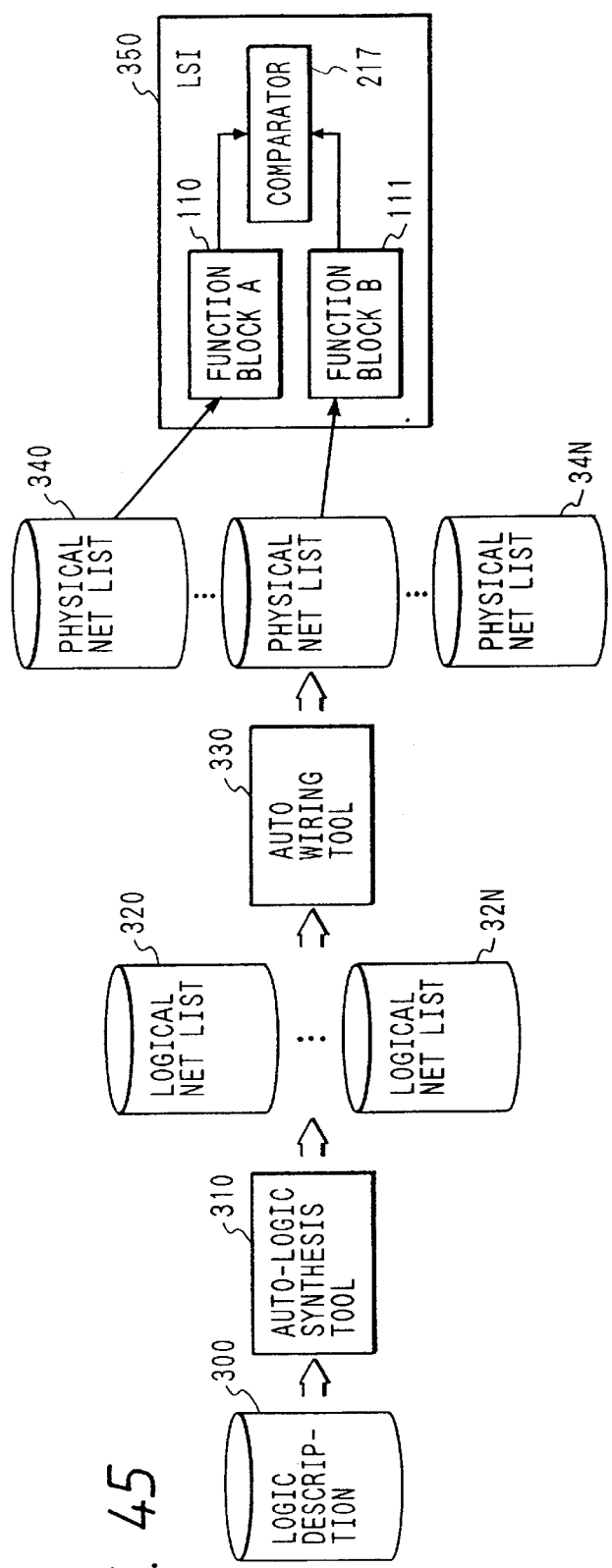
FIG. 45 is a diversified design by diversifying constraints.

In this case, the design constraints, such as the delay time, occupation area, etc., as well as the subject algorithm can be changed for logical synthesis and automatic wiring to diversify the target logical net lists 320 to 32N and physical net lists 340 to 34N as shown in FIG. 45.

Thus, the said dualized function blocks A110 and B111 are formed in the subject semi-conductor chip on the basis of the logical description of the said logical blocks by selecting two physical net lists from among the said diversified plural physical net lists.

Figure 46:
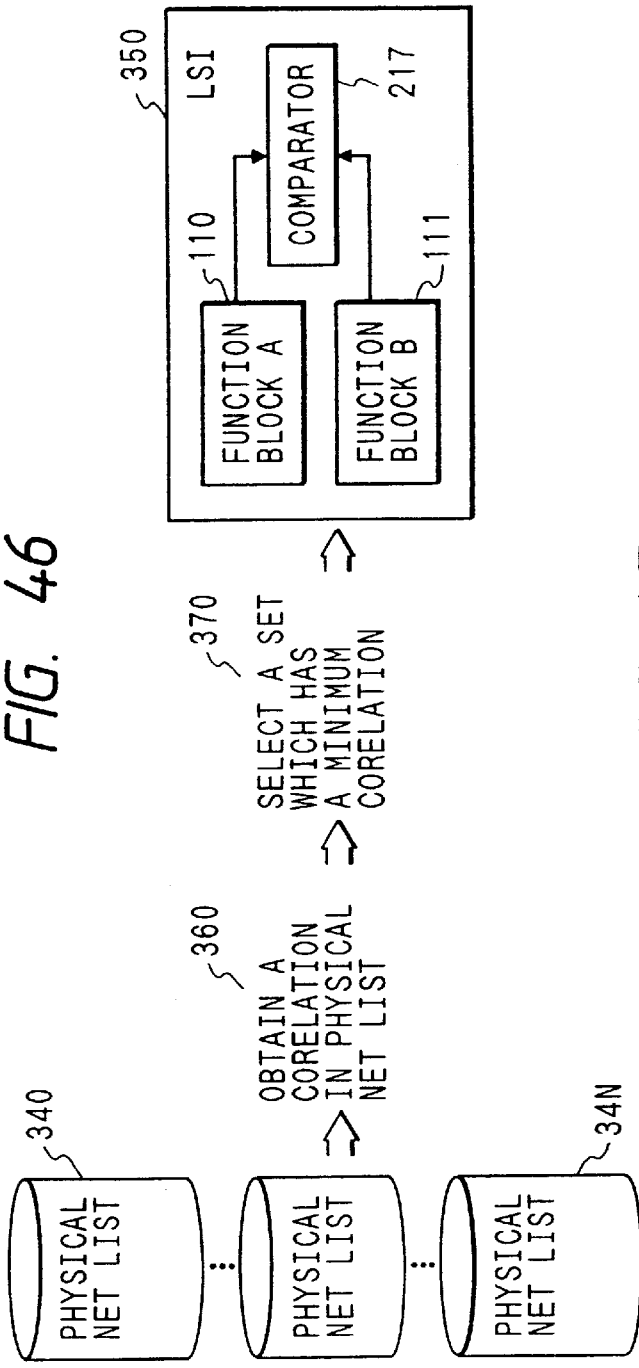
FIG. 46 is a diagram showing an example of extracting some design results from diversified design results.

To select two physical net lists from among many, as shown in FIG. 46, it is only necessary to define a correlation function that indicates how much those physical net lists resemble each other and find the correlation among them (procedure 360) and select a combination of the physical net lists (procedure 370) so that the correlation function may be minimized. In this case, fault characteristics of the semiconductor must be affected in the correlation function. In general, a wire intersection is pointed out as a weak point of semiconductors. At a wire intersection, two wires are separated only by a thin film oxide, so shortcircuits between wires and faults such as crosstalk, etc. are apt to occur. Furthermore, since one wire crosses over the other wire at such a wire intersection, the wire located at a different level is often cut off with stress. In other words, the status of the intersection between wires affects the fault characteristics of the semiconductors. The correlation function in which the fault characteristics of the semi-conductor is affected can thus be defined as follows.
[Formula 3]

However, the φijk must indicate whether an intersection exists between wiring nets and be defined as follows.
[Formula 4]

(2) Time Diversity

Faults that occur due to electric noise, etc. in any of the said at-least dualized function blocks can be prevented from affecting the other function block even when both of the function blocks are designed in the same way, by delaying the timings of their operations individually.

Figure 47:
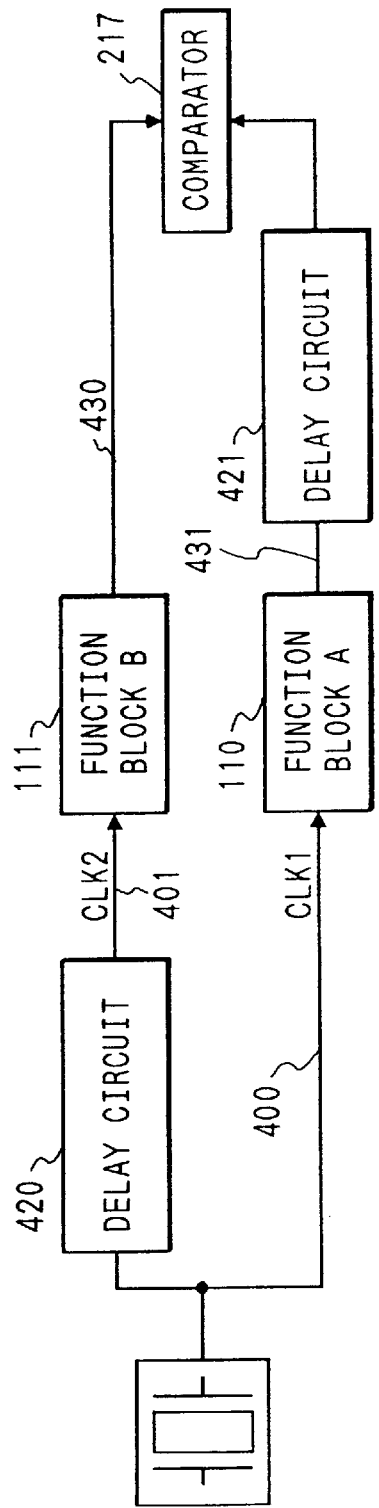
FIG. 47 is a diagram showing an example of diversifying an operation time.
Figure 48:
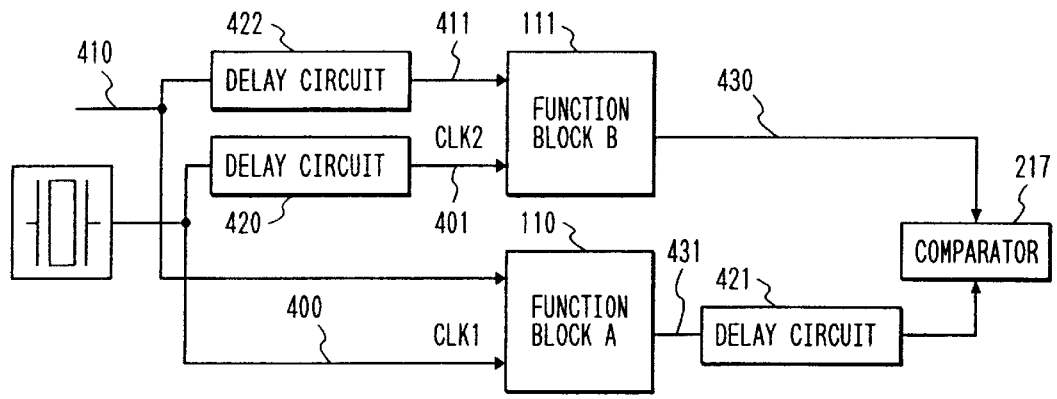
FIG. 48 is a diagram showing another example of diversifying an operation time.
Figure 49:
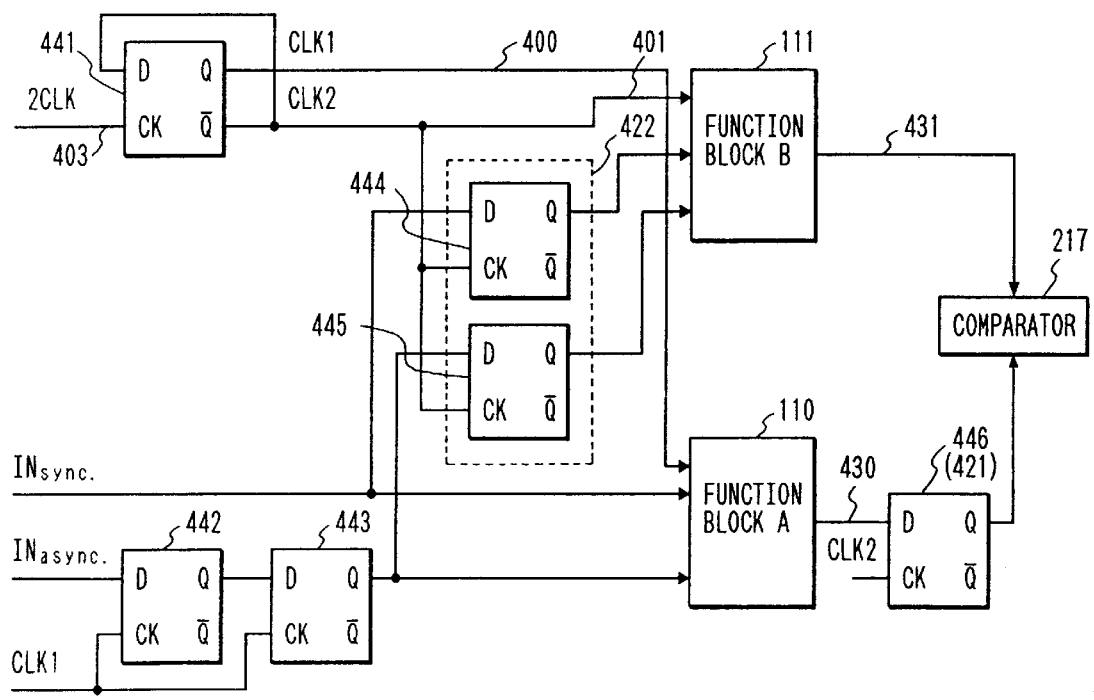
FIG. 49 is a diagram showing still another example of diversifying an operation time.

FIGS. 47, 48, and 49 show embodiments of a system to materialize such a time diversity. In the embodiment shown in FIG. 47, only the clock signal 401 is entered to the function block B111 of the dualized function blocks through the delay circuit 420 that is set a delay time (T delay) to delay the operation timing. In this case, the output 431 from the function block B111 is delayed by a certain time period (T delay) from the output 430 from the function block A110. Thus, the output 430 from the function block A110 is delayed by a certain time (T delay) using the delay circuit 421 so that outputs 430 and 431 are compared in the comparison circuit 217. In this embodiment, since the function blocks A110 and B110 can be operated at different timings from each other, malfunctions to be caused by power noise, etc. can be prevented from occurring concurrently in both function blocks A110 and B110. This allows a perfect self-checking logic to be realized by dualizing a function block and comparing outputs from both of the at-least dualized function blocks.

When there are signals 410 and 411 to be entered the dualized function blocks A110 and B111, only the signal 401 may be entered to the function block B111 through the delay circuit 422 that is set a delay time (T delay) as shown in FIG. 48.

In this embodiment, any delay time (T delay) can be selected, but the delay time (T delay) should be as large as possible to minimize the correlation of faults between the function blocks A110 and B111. To speed up the operation and detection of faults, however, the delay time (T delay) should be as small as possible. In addition, to minimize the mutual influence of noise between the function blocks A110 and B111 considering that power noise in a digital circuit is generated in synchronization with clock signals, the delay time (T delay) should be set as follows.

T delay=N+½ [clock cycle]

N=0, 1 . . .

To satisfy both items (influence by noise and operation speed) therefore, it is found that the most suitable delay time (T delay) is ½ [of the clock cycle].

FIG. 49 shows an embodiment of this invention, in which the delay time (T delay) is set to ½ [of the clock cycle]. The original clock signal 403 that has a frequency double that of the clock signals 400 and 401 of the dualized function blocks A110 and B111 is divided in the flip-flop 441 to become clock signals 400 and 401 whose phases are shifted by 1800, that is, ½ [of the clock cycle], from each other. They are then supplied to the function blocks A110 and B111 separately. Input signals INsync and INasync are supplied to the function block A110 without delay. They are then supplied to the function block B111 after being delayed by ½ [of the clock cycle] in the flip-flops 444 and 445 (equivalent to the delay circuit 422). The input signal INsync is synchronized with the clock signal 400. The input signal INasync is not synchronized with the clock signal 400. In other words, it is an asynchronous input signal. The INasync signal is synchronized with the clock signal 400 in the flip-flop circuits 442 and 443. The output 430 from the function block A110 is delayed by ½ [of the clock cycle] in the flip-flop circuit 446 (equivalent to the delay circuit 421) and compared with the output 431 from the function block B111 in the comparison circuit 217.

(3) Space Diversity

Figure 50:
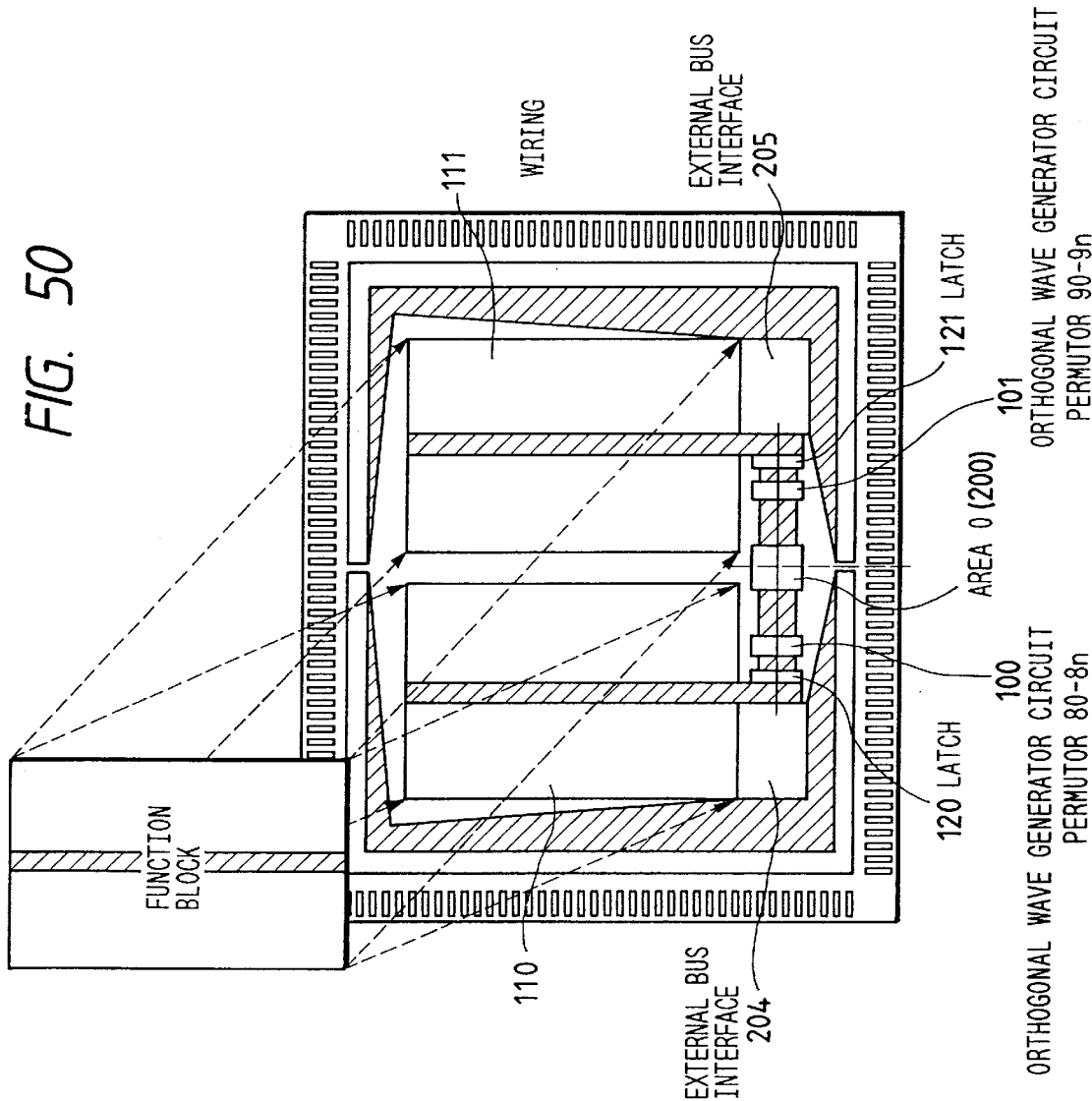
FIG. 50 is a view of an embodiment of a layout in a chip.

When one of the dualized function blocks is separated from the other, it becomes possible to prevent temporary faults from occurring in one of dualized function blocks due to electrical noise, cosmic rays, radiation, etc., as well as due to the damage of the subject semi-conductor chip from affecting the other. When a function block is dualized in a chip as A110 and B111 and each is checked by itself, the dualized function blocks A110 and B111 should be arranged in the same direction and in the same pattern as shown in FIG. 50 to maximize the effectiveness of the space diversity. The corresponding sections of the dualized function blocks can thus have the same distance. As a result, it is possible to prevent that the said corresponding sections of the dualized function blocks from coming excessively close to each other which could deteriorate the said effectiveness of the space diversity.

In this embodiment, the comparison circuits 30 to 3n used to compare outputs, the area 0 (200) comprising an integrator circuit 5, orthogonal waveform generator circuits 100 and 101, permutors 80 to 8n and 90 to 9n, latches 120 and 121 are arranged symmetrically so that their wirings may become short-cut and wiring intersections may be reduced to ensure the continuity. In such a symmetrical arrangement of circuits, the outputs a0'–an' and b01–bn' from the function blocks A110 and B111 come most closely in the area 0 (200). However, since each orthogonal waveform is placed on another to eliminate the correlation between the waveforms, faults due to a short, etc. can be prevented. According to this embodiment, the effectiveness of the space diversity can be applied to isolate faults in one of the dualized function blocks from the other function block for securing the wiring continuity, improving the self-checking performance (fault detection rate and detection coverage) and to realize small-sized self-checking logical circuits.

This invention can provide a new method that assures fail-safe operation even in the face of a false signature caused by a short. No special constraint is needed to provide fail-safe logic circuits according to this invention. In addition, existing semi-conductor technologies, design automation tools, etc. can also be used effectively to reduce the cost and time of development significantly.

What is claimed is:

1. A distributed fault tolerant system having a plurality of computer modules assigned to execute a plurality of tasks, comprising:

selection means, responsive to occurrence of a fault in any of the computer modules of the system, for selecting at least one of the computer modules having the tasks assigned thereto other than the task that was being performed by a computer module in which the fault occurred; and assigning means for assigning the selected computer module the task that was being performed by the computer module in which the fault occurred and making the selected computer module execute the task, wherein the selection means decides a computer module to be selected from among the other computer modules having different tasks assigned thereto based on an indicated importance of each of the tasks executed in the system.

2. The distributed fault tolerant system according to claim 1 wherein each computer module has a communication control means that is capable of sending situation information of the fault having occurred in said computer module to the other computer modules.

3. A distributed fault tolerant system having a plurality of redundant computer modules assigned to execute a plurality of tasks, comprising:

computer module task changing means for changing a number of the computer modules executing the tasks based on a number of normal ones of the computer modules; and task assigning means for assigning the tasks to the changed number of the computer modules including the normal ones of the computer modules based on an indicated importance of each of the tasks.

4. A method of redundant resource management in a distributed fault tolerant system having a plurality of redundant computer modules assigned to execute a plurality of tasks, said method comprising:

a step of changing a number of computer modules redundantly executing the tasks, based on a number of normal ones of the computer modules; and a step of assigning the tasks to the changed number of the computer modules including the normal ones of the computer modules based on an indicated importance of each of the tasks.

5. The method of redundant resource management according to claim 4, wherein if the number of the normal computer modules is decreased by occurrence of fault, the number of the computer modules redundantly executing the tasks is decreased and as task are high in the importance, the number of computer modules assigned to the tasks is increased.

6. The method of redundant resource management according to claim 4, wherein an evaluation function is calculated for each of the tasks based on a fault detection situation in each of the computer modules executing redundantly and if there is a first task wherein the evaluation function indicates a decrease, the computer module executing a second task wherein the evaluation function indicates it is higher is made to execute the first task.

7. The method of redundant resource management according to claim 6, wherein all the computer modules calculate the evaluation functions for the respective tasks and when there is the first task wherein the evaluation function indicates a decrease and when a value of the evaluation function of the second task executed in the computer module is higher than the first task, the computer module halts execution of the second task before executing the first task.

8. The method of redundant resource management according to claim 4, wherein each of the computer modules reports to the other computer modules a task number of a task in execution and fault occurrence information, estimates reliabilities of the tasks based on the fault occurrence information reported from the other computer modules, decides in which task of redundant information the computer module should participate in, and if the task to participate in is different from the one currently in execution, switching is made from the task currently in execution to the task to participate in.

9. A method of redundant resource management in a distributed fault tolerant system having a plurality of redundant computer modules assigned to execute a plurality of tasks said method comprising:

a step of changing a number of computer modules redundantly executing the tasks based on a number of normal ones of the computer modules and importances of the tasks, wherein an evaluation function is calculated for each of the tasks based on a fault detection situation in each of the computer modules executing redundantly and if there is a first task having the evaluation function decreased, the computer module executing a second task having higher evaluation function is made to execute the first task, wherein all the computer modules calculate the evaluation functions for the respective tasks and when there is the first task having the evaluation function decreased if a value of the evaluation function of the second task executed in the computer module is higher than the first task, the computer module halts execution of the second task before executing the first task, wherein Fij represents the evaluation function for the computer module i where i is 1 to N, which is number of the computer modules, and is defined as $$Fij = Lrj = Lthij, \text{ and}$$

wherein Lthij is a threshold value of a reliability level of task j in the computer module i, Lrj is a reliability level of task j, i is the computer module number, and j is a task number, and task j for minimizing the evaluation function Fij is decided as a process to execute.

10. A method of redundant resource management in a distributed fault tolerant system having a plurality of redundant computer modules assigned to execute a plurality of tasks, said method comprising:

a step of changing a number of computer modules redundantly executing the tasks based on a number of normal ones of the computer modules and importances of the tasks, wherein an evaluation function is calculated for each of the tasks based on a fault detection situation in each of the computer modules executing redundantly and if there is a first task having the evaluation function decreased, the computer module executing a second task having higher evaluation function is made to execute the first task, wherein all the computer modules calculate the evaluation functions for the respective tasks and when there is the first task having the evaluation function decreased if a value of the evaluation function of the second task executed in the own computer module is higher than the first task, the computer module halts execution of the second task before executing the first task, wherein Fij represents the evaluation function for the computer module i where i is 1 to N, which is number of the computer modules, and is defined as $$Lij = Lrj/Lthij, \text{ and}$$

wherein Lthij is a threshold value of a reliability level of task j in the computer module i, Lrj is a reliability level of task j, i is the computer module number, and j is a task number, and task j for minimizing the evaluation function Fij is decided as a process to execute.

11. A method of redundant resource management in a distributed fault tolerant system having a plurality of redundant computer modules assigned to execute a plurality of tasks to execute said method comprising:

a step of changing a number of computer modules redundantly executing the tasks based on a number of normal ones of the computer modules and importances of the tasks, wherein an evaluation function is calculated for each of the tasks based on a fault detection situation in each of the computer modules executing redundantly and if there is a first task having the evaluation function decreased, the computer module executing a second task having higher evaluation function is made to execute the first task, wherein all the computer modules calculate the evaluation functions for the respective tasks and when there is the first task having the evaluation function decreased if a value of the evaluation function of the second task executed in the own computer module is higher than the first task, the computer module halts execution of the second task before executing the first task, wherein Fij represents the evaluation function for the computer module i where i is 1 to N, which is number of the computer modules, and is defined as $$Fij = \log\{(1-Lthij)/pej\}, \text{ and}$$

wherein Lthij is a threshold value of a reliability level of task j in the computer module i, Pej is a probability of wrong calculation results of task j, i is an own computer module number, and j is a task number, and task j for minimizing the evaluation function Fij is decided as a process to execute.

12. A method of redundant resource management in a distributed fault tolerant system having a plurality of redundant computer modules assigned to execute a plurality of tasks to execute said method comprising:

a step of changing a number of computer modules redundantly executing the tasks based on a number of normal ones of the computer modules and importances of the tasks, wherein an evaluation function is calculated for each of the tasks based on a fault detection situation in each of the computer modules executing redundantly and if there is a first task having the evaluation function decreased, the computer module executing a second task having higher evaluation function is made to execute the first task, wherein all the computer modules calculate the evaluation functions for the respective tasks and when there is the first task having the evaluation function decreased if a value of the evaluation function of the second task executed in the own computer module is higher than the first task, the computer module halts execution of the second task before executing the first task, and wherein the threshold value Lthij is decided in advance for each of the computer modules and each of the tasks and the reliability level Lrj is decided on the basis of the fault occurrence information.

13. A method of redundant resource management in a distributed fault tolerant system having a plurality of redundant computer modules assigned to execute a plurality of tasks to execute said method comprising:

a step of changing a number of computer modules redundantly executing the tasks based on a number of normal ones of the computer modules and importances of the tasks, wherein an evaluation function is calculated for each of the tasks based on a fault detection situation in each of the computer modules executing redundantly and if there is a first task having the evaluation function decreased, the computer module executing a second task having higher evaluation function is made to execute the first task, wherein all the computer modules calculate the evaluation functions for the respective tasks and when there is the first task having the evaluation function decreased if a value of the evaluation function of the second task executed in the own computer module is higher than the first task, the computer module halts execution of the second task before executing the first task, wherein in deciding task j for minimizing the evaluation function Fij, task j is decided as a task to participate if the evaluation function Fij meets $$Fij < Fik - \delta, \text{ and}$$

where k is a currently executed task number and $\delta$ is a width of dead-zone.

14. A method of redundant resource management in a distributed fault tolerant system having a plurality of redundant computer modules assigned to execute a plurality of tasks to execute said method comprising:

a step of changing a number of computer modules redundantly executing the tasks based on a number of normal ones of the computer modules and importances of the tasks, wherein an evaluation function is calculated for each of the tasks based on a fault detection situation in each of the computer modules executing redundantly and if there is a first task having the evaluation function decreased, the computer module executing a second task having higher evaluation function is made to execute the first task, wherein all the computer modules calculate the evaluation functions for the respective tasks and when there is the first task having the evaluation function decreased if a value of the evaluation function of the second task executed in the own computer module is higher than the first task, the computer module halts execution of the second task before executing the first task, wherein the reliability level Lrj is set as a motion average of the reliability level of task j for every unit of time.

* * * * *